United States Patent [19]
Iwasaki

[11] Patent Number: 5,768,540
[45] Date of Patent: Jun. 16, 1998

[54] PHOTOMETRIC APPARATUS

[75] Inventor: Hiroyuki Iwasaki, Yokohama, Japan

[73] Assignee: Nikon Corporation, Tokyo, Japan

[21] Appl. No.: 748,032

[22] Filed: Nov. 12, 1996

[30] Foreign Application Priority Data

Dec. 13, 1995 [JP] Japan .................................. 7-324427
Mar. 19, 1996 [JP] Japan .................................. 8-062338

[51] Int. Cl.[6] .............................. G03B 7/08; G01J 1/42; H04N 5/235
[52] U.S. Cl. ......................... 396/234; 356/222; 348/298
[58] Field of Search ................................. 396/233, 234, 396/96; 356/222, 215; 348/297–299, 229, 230

[56] References Cited

U.S. PATENT DOCUMENTS 5,526,092  6/1996  Iwasaki ........................ 396/234

FOREIGN PATENT DOCUMENTS 6-95200  4/1994  Japan.

*Primary Examiner*—W. B. Perkey

[57] ABSTRACT

A photometric apparatus is capable of obtaining a precise photometric value without any saturation of a photometric output value even when measuring a light intensity of a flicker light source. The photometric apparatus has a photometric portion for measuring the field by use of a charge type photometric device, and a charge time determining portion for determining a value of a next charge time of the photometric device on the basis of an output value of the photometric portion and a value of the charge time at that time. The charge time determining portion determines the value of the next charge time so that a photometric output value in the next photometric process approximates a predetermined target value.

22 Claims, 23 Drawing Sheets

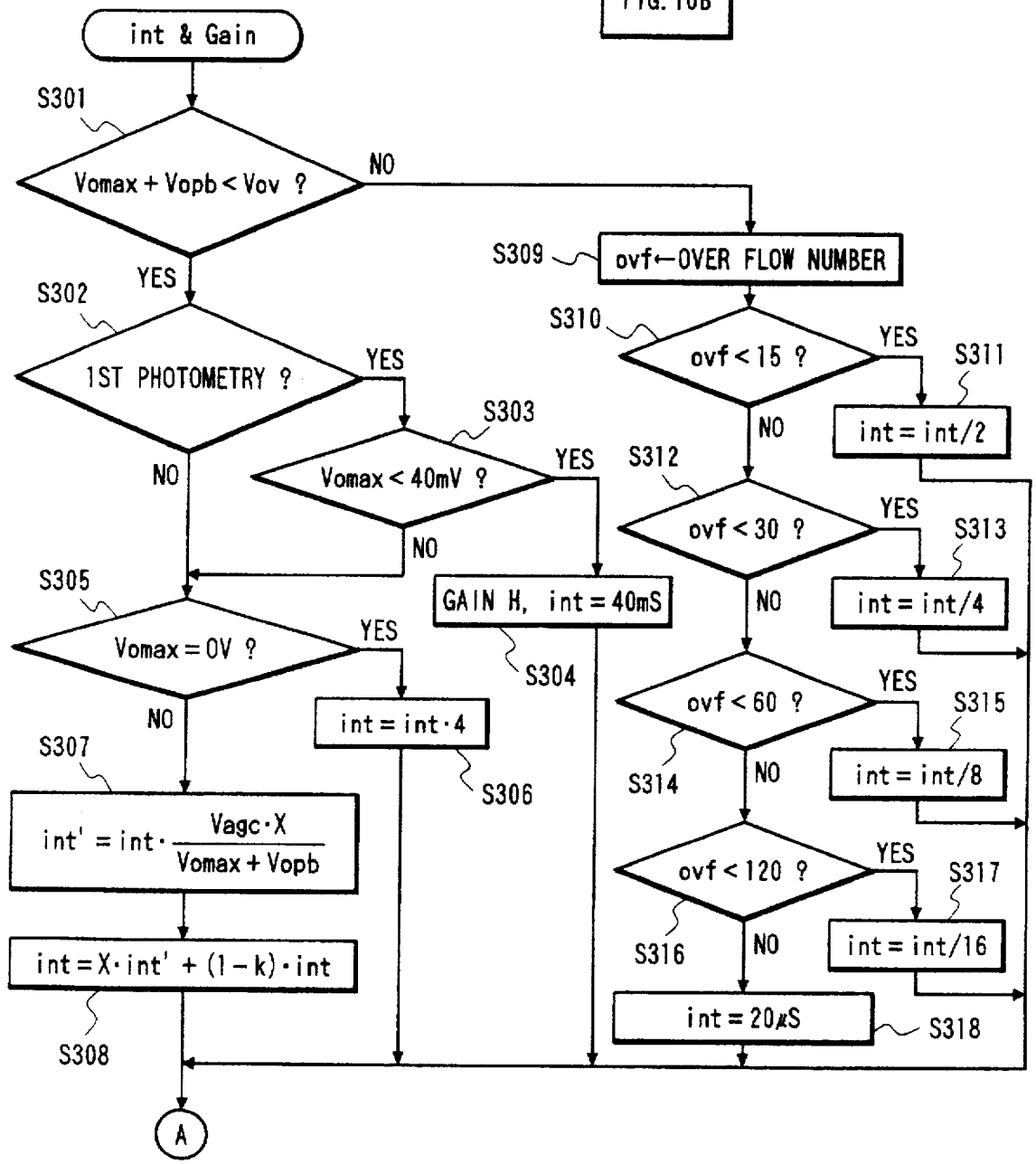

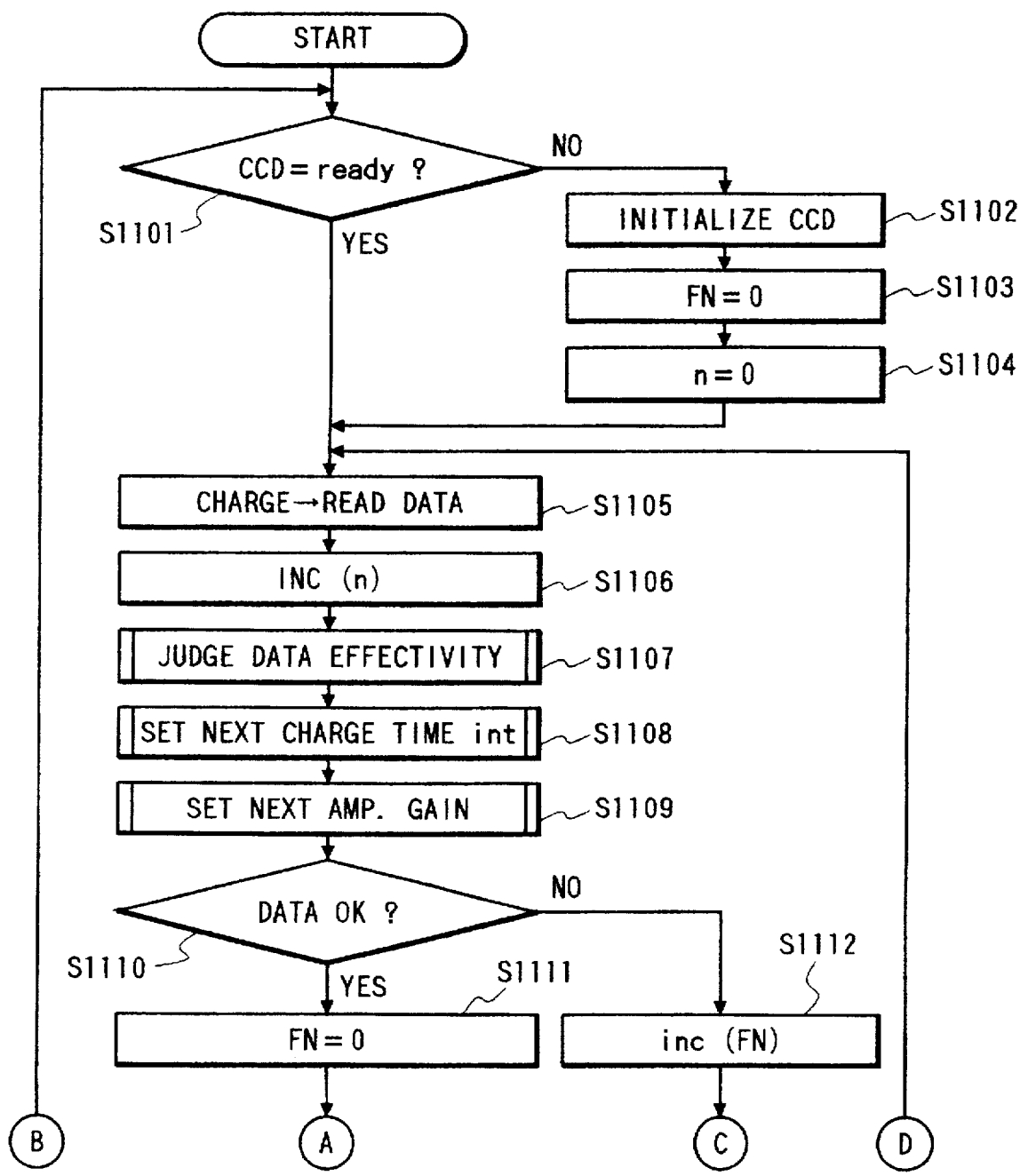

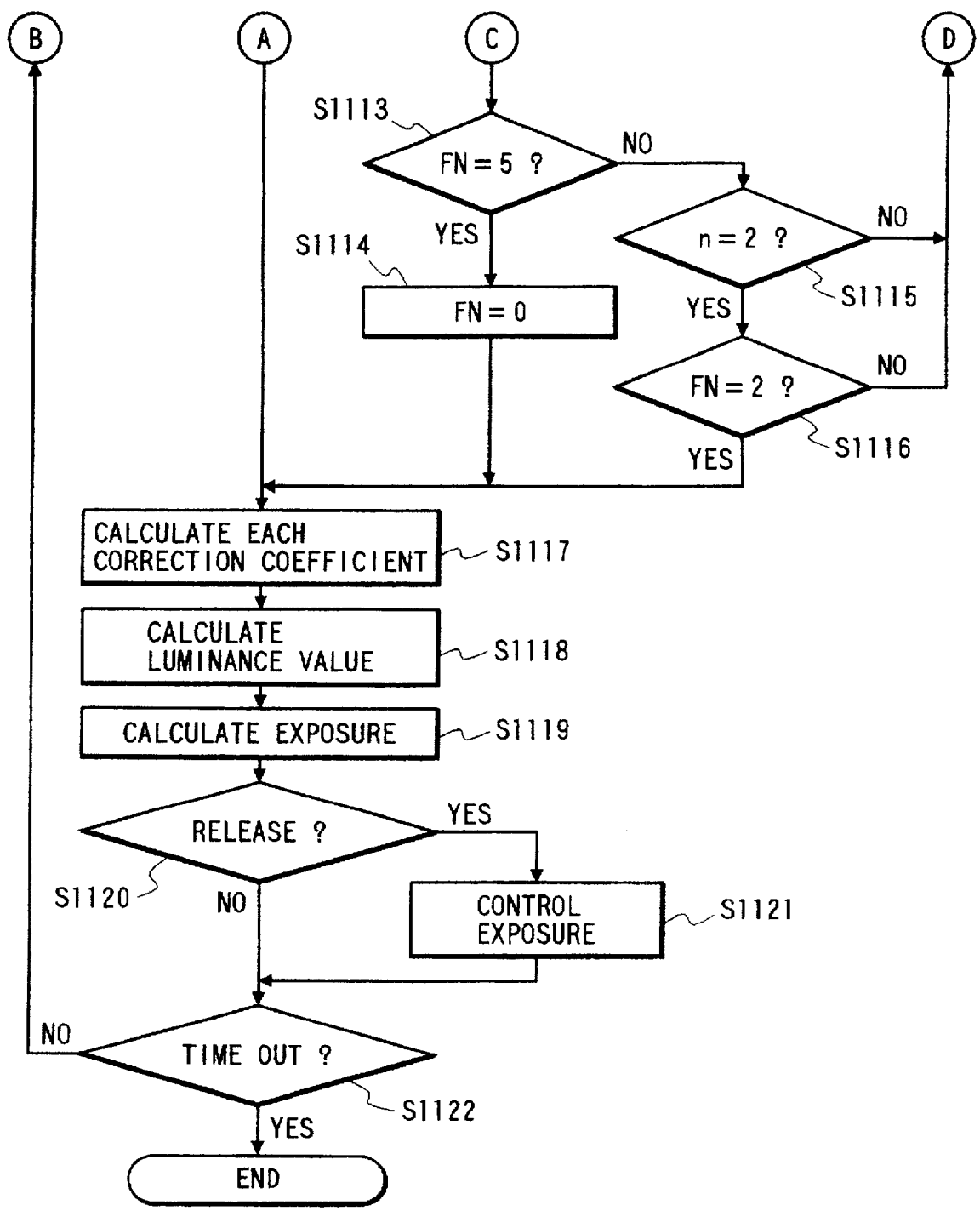

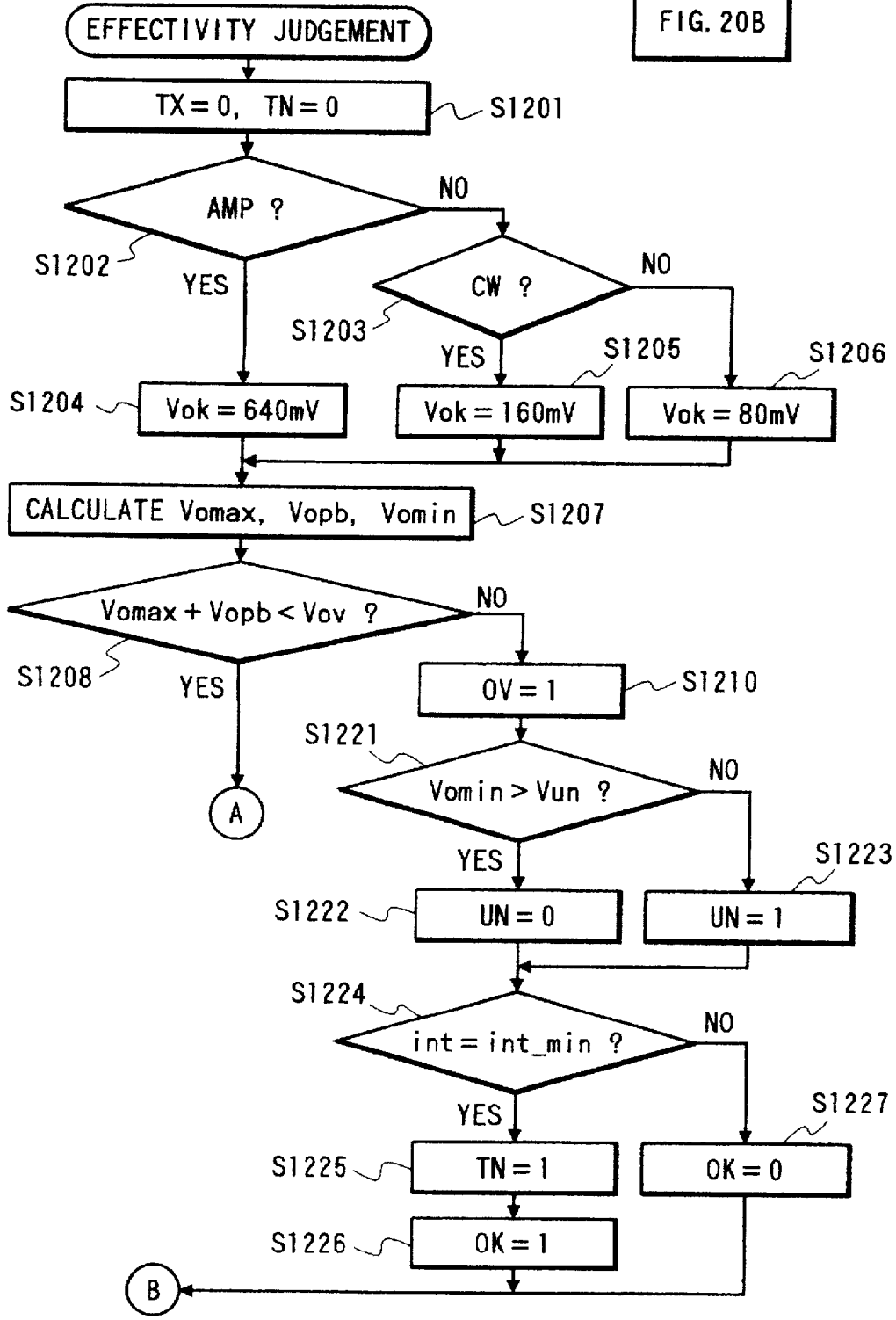

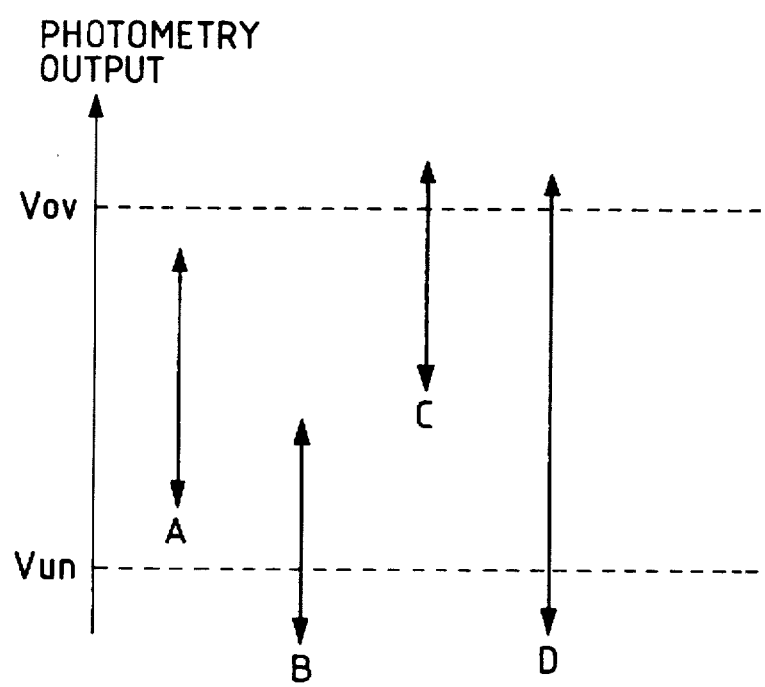

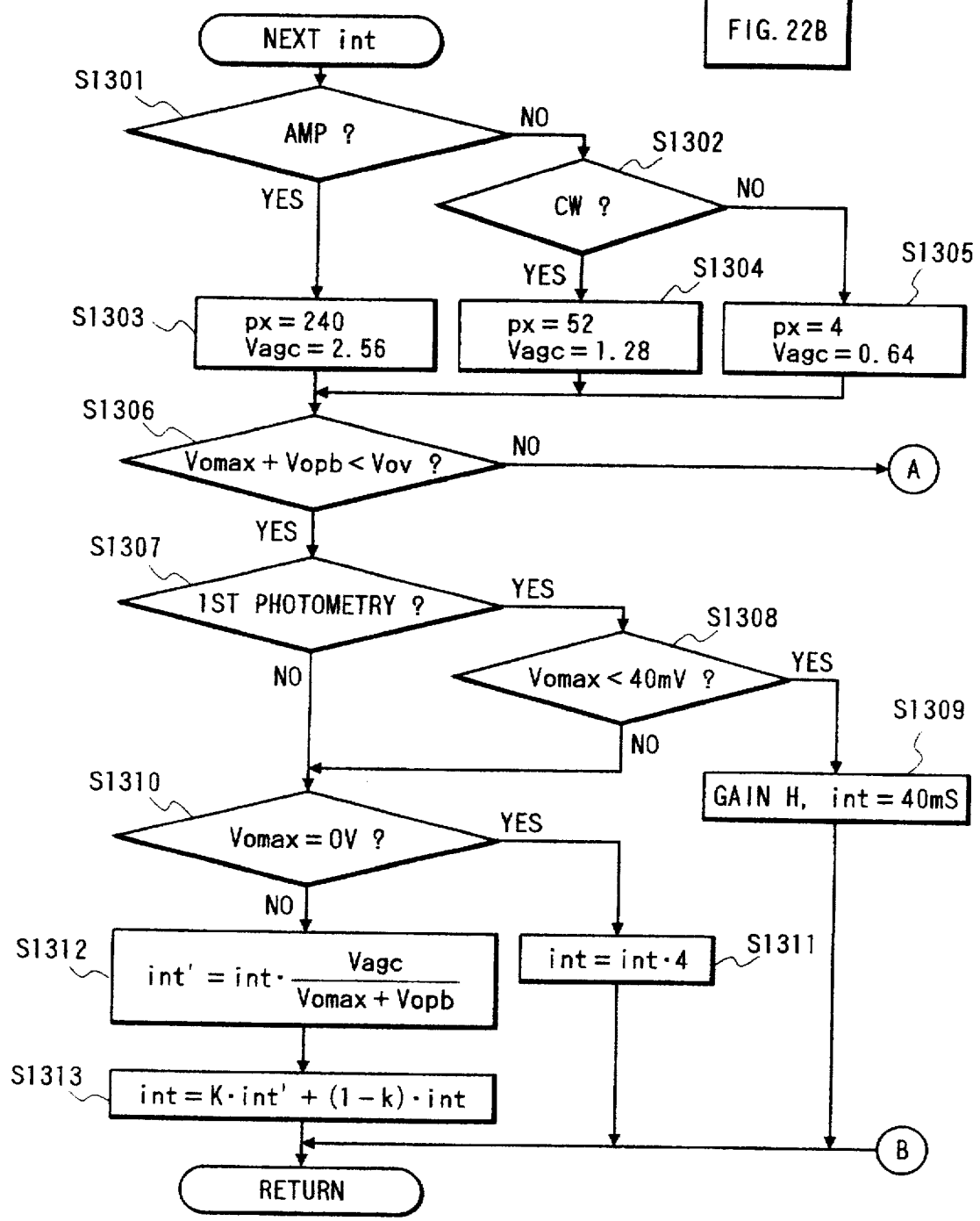

PHOTOMETRIC APPARATUS

BACKGROUND OF THE INVENTION

1. Field of the Invention

The present invention relates generally to a photometric apparatus for measuring a luminance of an object and, more particularly, to a photometric apparatus suitable for use of automatic exposure control of a camera.

2. Related Background Art

Some conventional photometric apparatuses use of a charge type photometric device. When charge time of a next photometric process is obtained from a photometric value and a charge photometric process, of a last time, the charge time of the next photometric process is calculated on the assumption that a brightness of the field when in the next photometric process is substantially equal to that of the last photometric process. In this photometric apparatus, a photometric period is faster than motion of an ordinary object illuminated with solar light, and therefore no particular problem arises.

In the illumination given by an AC power supply, however, a so-called flicker phenomenon, wherein a light quantity repeatedly increases and decreases depending on a period (e.g., 100 Hz in the case of a 50 Hz power supply) corresponding to the power supply period. This flicker period is much faster than the motion of the object and is also faster than a photometric period of a normal photometric apparatus. As a result, the illumination state in the last photometric process is not equal to the illumination state in the next photometric process.

In such a case, as described above, prediction is impossible using a method of obtaining the charge time of the next photometric process from the charge time and the photometric value of the last photometric process.

To obviate this problem, there was proposed a photometric apparatus (Japanese Patent Laid-Open Application No. 6-95200) intended to actualize the stable photometry, wherein, as shown in FIG. 13A, the photometric process is executed twice with a ½ period of the flicker period of the illumination light source. The photometric value and the charge time of the next photometric process are calculated based on an average value of those photometric values.

In the above-described conventional photometric apparatus, however, the photometric value of each photometric process has a dispersion corresponding to an intensity of the flicker rather than a staple dispersion of the flicker. A magnitude of the photometric output value depends on the charge time. The the charge time is normally set so that the photometric output value becomes a value slightly smaller than a saturation output voltage so that the photometric dynamic range is as wide as possible.

Under such setting, when measuring a light intensity of the flicker light source, the photometric value of each time comes to have the dispersion for the reason elucidated above. As shown in FIG. 13B, when the photometric output value is large, it may happen that the output is saturated over the photometric dynamic range, and a correct photometric value can not be obtained.

FIG. 24 is a block diagram illustrating one example of the prior art photometric apparatus.

A photometric output from a photometric circuit 50 is converted into a numerical value by an A/D converter 51 and is thereafter connected to a calculating portion 52, a charge time setting portion 53 and a judging portion 55.

The calculating portion 52 calculates a photometric value based on an output of the A/D converter 51.

The charge time setting portion 53 calculates a charge time of the next time so that the output when in the next photometric process comes in the vicinity of a target value on the basis of the output of the A/D converter 51. The charge time setting portion and outputs this charge time to a charge control portion 54.

The judging portion 55 judges whether the photometric output of this time falls within the photometric dynamic range on the basis of the output of the A/D converter 51, and outputs a result of the judgement to the charge control portion 54.

The charge control portion 54 controls the photometric circuit 50 on the basis of the charge time given from the charge time setting portion 53 and the judged result given by the judging portion 55. This charge control portion 54, if the photometric output of this time does not fall within the photometric dynamic range, makes the photometric value ineffective and controls the photometric circuit 50 to reexecute the photometric process, and so forth.

The above-mentioned prior art photometric apparatus adopts a so-called software AGC system, wherein the charge time of the next time is set based on the photometric output and charge time of the last time. This software AGC system is based on the assumption that a field luminance of the last time is substantially the same as that of the next time.

In fact, however, it may often happen that the field luminance momentarily changes. Especially in the case of the photometric apparatus of a camera, a quantity of the light incident upon the photometric apparatus changes due to variations in a camera framing.

Furthermore, if the light source for illuminating the object with the light is a fluorescent lamp, a so-called flicker phenomenon occurs in which the light quantity fluctuation is synchronized with a frequency of the power supply. Therefore, it is quite difficult to predict the light quantity when in the next photometric process. For this reason, a photometric output as predicted could not be obtained in the great majority of cases.

In the above-described photometric apparatus, the judging portion 55 always uses the same value as a judging value for judging whether the photometric value is effective or ineffective. Furthermore, the charge time setting portion 53 always uses the same value as a photometric output target value for setting the charge time of the next time.

Some of the photometric apparatuses, however, have a plurality of photometric modes. The photometric apparatus of the camera includes, for example, a division photometric mode for measuring a light intensity by dividing the field, a center emphatic photometric mode for measuring emphatically a light intensity of the central portion of the field, and a spot photometric mode for measuring a light intensity of a very narrow area of the field. These different modes have different methods of calculating photometric output areas to be used, the number of areas, and photometric outputs.

The above-described conventional photometric apparatus, however, does not consider the above concerns. As a result effective photometric data, depending on the photometric mode, are ineffective. In the same way, ineffective data are determined to be effective, or photometric data becomes ineffective because the target value for setting the charge time is improper.

SUMMARY OF THE INVENTION

It is a primary object of the present invention to provide a photometric apparatus capable of obtaining a precise photometric value without saturation of a photometric output value even when measuring a light intensity of a flicker light source.

It is another object of the present invention to provide a photometric apparatus capable of exhibiting a high photometric efficiency with a high reliability by setting an optimal target value in accordance with a set photometric mode and reducing photometric errors.

It is still another object of the present invention to provide a highly reliable photometric apparatus with no futility by optimizing a judgement value of effectiveness and ineffectiveness in accordance with a set photometric mode and reducing the photometric errors.

To accomplish the above objects, according to a first aspect of the present invention, there is provided a photometric apparatus comprising a photometric portion for measuring a light intensity of a field by use of a charge type photometric device, and a charge time determining portion for determining a value of a next charge time of the photometric device on the basis of an output value of the photometric portion and the value of the charge time at that time. The charge time determining portion determines the value of the charge time of the next time so that the photometric output value when in the next photometric process approximates a predetermined target value.

According to the first aspect of the present invention, the charge time determining portion changes the target value in accordance with a value of a charge time of the last time.

According to the first aspect of the present invention, the photometric device is a division type device capable of outputting a plurality of photometric outputs. The determining portion determines the value of the charge time of the next time so that a maximum value of the plurality of photometric outputs of the photometric device approximates the target value.

According to the first aspect of the present invention, the determining portion sets the target value high if the charge time of the last time is long and sets the target value small if short.

According to a second aspect of the present invention, there is provided a photometric apparatus comprising a photometric circuit for measuring a light intensity of a field by use of a charge type photometric device while dividing the field into a plurality of areas and outputting a plurality of photometric outputs corresponding to the plurality of areas. The photometric apparatus also comprises a photometric mode setting portion capable of setting a plurality of photometric modes, a target value setting portion for setting a target value of the output of the photometric circuit in accordance with setting by the photometric mode setting portion, and a charge time determining portion for determining a new charge time of the photometric device on the basis of the output of the photometric circuit, a charge time at that time and the target value of the target value setting portion.

According to the second aspect of the present invention, the photometric mode setting portion selects the area to be used among the plurality of areas in accordance with the set photometric mode.

According to the second aspect of the present invention, the photometric mode setting portion is capable of setting a plurality of photometric areas having different sizes. The target value setting portion sets the target value smaller with the smaller photometric area.

According to the second aspect of the present invention, the photometric mode setting portion is capable of setting a first mode for calculating a luminance value of a specified area of the field, and a second mode for calculating a plurality of luminance values with respect to the plurality of areas of the field on the basis of outputs of the photometric circuit. The target value setting portion sets a target value in the first mode smaller than a target value in the second mode.

According to a third aspect of the present invention, there is provided a photometric apparatus comprising a photometric circuit for measuring a light intensity of a field by use of a charge type photometric device while dividing the field into a plurality of areas and outputting a plurality of photometric outputs corresponding to the plurality of areas. The photometric apparatus also comprises a charge time determining portion for determining a new charge time of the photometric device on the basis of the output of the photometric circuit, and a charge time at that time, a photometric mode setting portion capable of setting a plurality of photometric modes, a fiducial value setting portion for setting a fiducial value in accordance with setting by the photometric mode setting portion, and an effectiveness judging portion for judging whether the output of the photometric output is effective or ineffective on the basis of the fiducial value and the output of the photometric circuit.

According to the third aspect of the present invention, the photometric mode setting portion selects the area to be used among the plurality of areas in accordance with the set photometric mode.

According to the third aspect of the present invention, the photometric mode setting portion is capable of setting a plurality of photometric areas having different sizes. The fiducial value setting portion sets the fiducial value smaller with the smaller photometric area.

According to the third aspect of the present invention, the photometric mode setting portion is capable of setting a first mode for calculating a luminance value of a specified area of the field, and a second mode for calculating a plurality of luminance values with respect to the plurality of areas of the field on the basis of outputs of the photometric circuit. The fiducial value setting portion sets a fiducial value in the first mode smaller than a fiducial value in the second mode.

According to the third aspect of the present invention, the photometric mode setting portion selects the area to be used among the plurality of areas in accordance with the set photometric mode. The effectiveness judging portion compares an output value of a maximum luminance within the using areas with the fiducial value and, if the output value is larger than the fiducial value, judges that the output of the photometric circuit is effective.

BRIEF DESCRIPTION OF THE DRAWINGS

Other objects and advantages of the present invention will become apparent during the following discussion in conjunction with the accompanying drawings, in which:

FIG. 19 is comprised of FIGS. 19A and 19B illustrating a flowchart showing an algorithm in this embodiment;

FIG. 21 is an explanatory diagram showing a relationship between the photometric output and the dynamic range;

DESCRIPTION OF THE PREFERRED EMBODIMENTS

Embodiments of the present invention will hereinafter be described with reference to the accompanying drawings.

Figure 1:
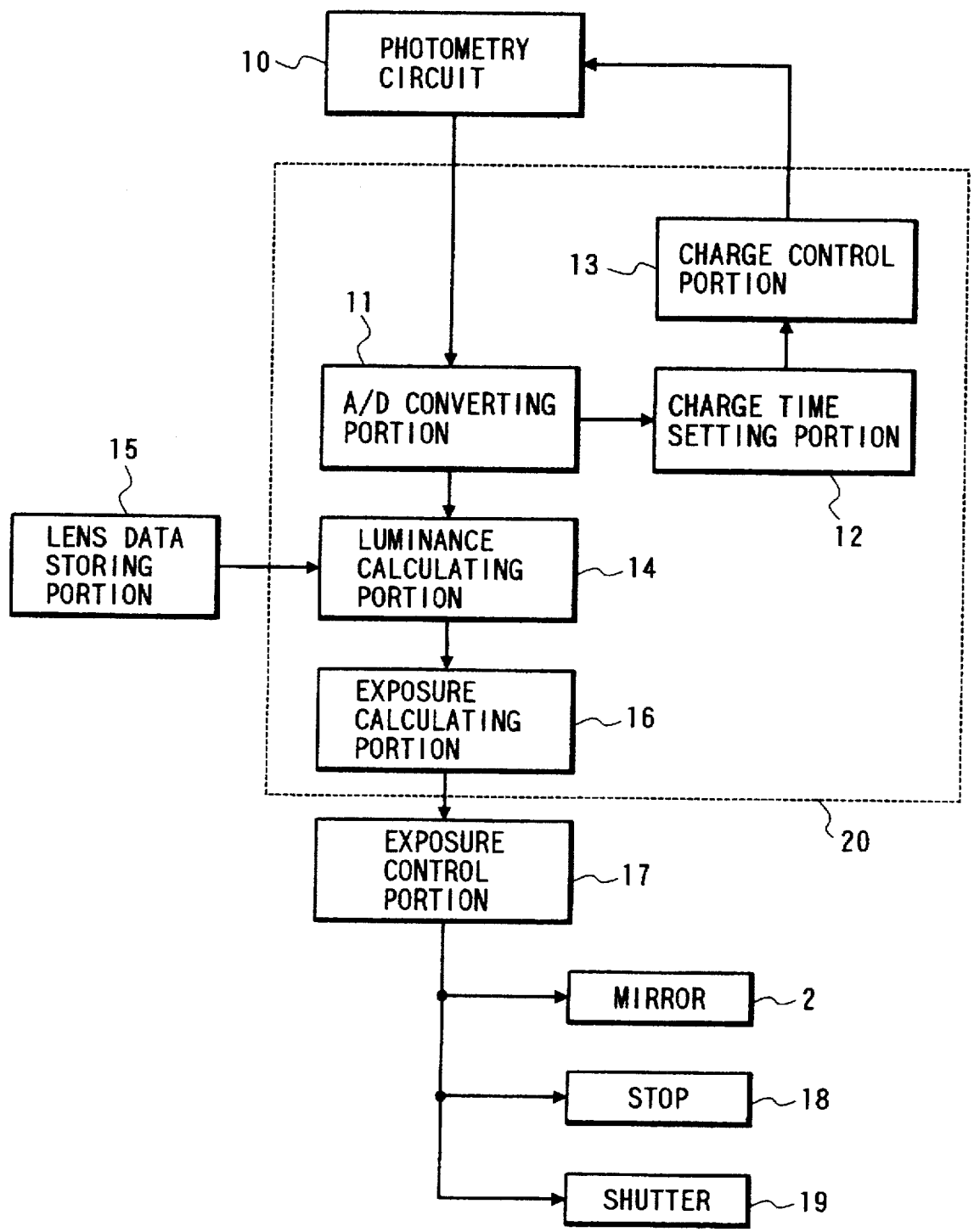
FIG. 1 is a block diagram illustrating a construction of an embodiment of the present invention.

FIG. 1 is a block diagram schematically illustrating a photometric apparatus of a camera in accordance with one embodiment of the present invention.

A photometric circuit 10 is a circuit for measuring luminous intensity of an object and outputting photometric data. The photometric data is converted into a numerical value by an A/D converting portion 11 and thereafter outputted to a luminance calculating portion 14. The luminance calculating portion 14 calculates a value of luminance of the object on the basis of the photometric data from the A/D converter 11, in addition to data relating to a focal length of a phototaking lens, an open aperture value, and an exit pupil and vignetting, inputted from a lens data storing portion 15 incorporated into the phototaking lens. Outputs of the luminance calculating portion 14 are supplied to an exposure calculating portion 16.

The exposure calculating portion 16 calculates a proper exposure value of the object based on the luminance value from the luminance calculating portion 14.

An exposure control portion 17 exposes a film by controlling a mirror 2, a stop 18, and a shutter 19 on the basis of the proper exposure value obtained by the exposure calculating portion 16, upon depressing an unillustrated release button of the camera.

A charge time setting portion 12 calculates a charge time for a next time on the basis of a charge time of the last time and the numerical value data converted by the A/D converting portion 11. The charge time setting portion 12 sets the photometric circuit 10 to measure a luminous intensity for the next time through the charge time control portion 13.

The A/D converting portion 11, the charge time setting portion 12, the charge control portion 13, the luminance calculating portion 14 and the exposure calculating portion 16 are all actualized by microprocessors 20 defined as control circuits. Programs in the microprocessors 20 will subsequently be explained in greater detail.

Figure 2:
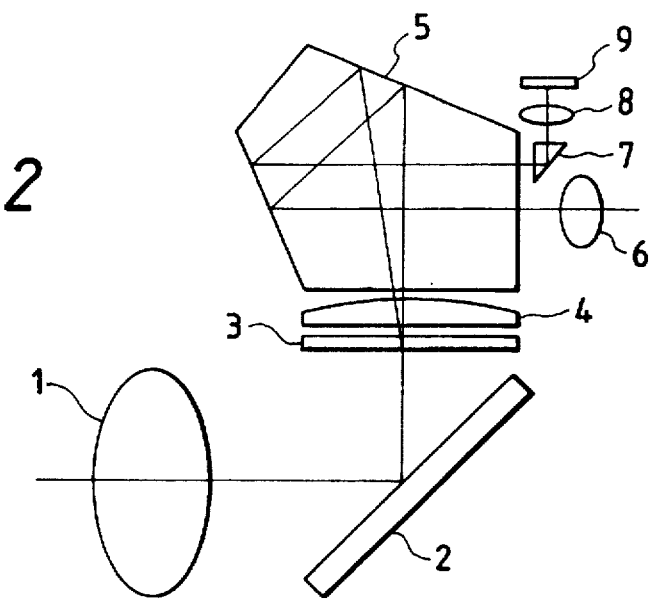
FIG. 2 is a view illustrating an optical system in this embodiment.

FIG. 2 is a block diagram illustrating an optical system of the photometric apparatus in accordance with this embodiment.

Light beams passing through the phototaking lens 1 further travel via a quick return mirror 2, a diffusion screen 3, a condenser lens 4, a penta prism 5 and an eyepiece 6 and thus reach an eye of a photographer.

On the other hand, part of the light beams are diffused by the diffusion screen 3 and thereafter reach a photometric device 9 via the condenser lens 4, the penta prism 5, a photometric prism 7 and a photometric lens 8.

Figure 3:
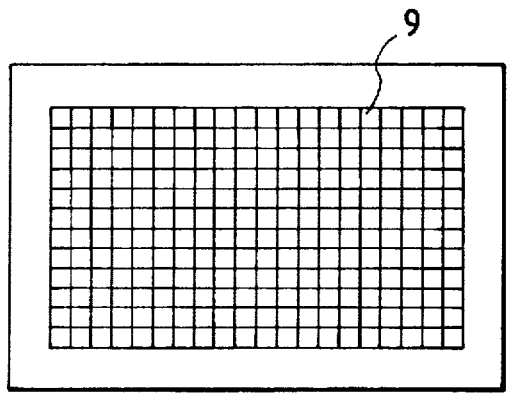
FIG. 3 is a diagram showing how a photometric device is divided in this embodiment.

FIG. 3 is a view illustrating segmented areas of the photometric device 9, corresponding to a field.

The photometric device 9 is constructed of a charge type sensor such as, a CCD. The photometric device 9 includes a total of 240 segmented areas, 12 in the vertical direction and 20 in the horizontal direction. As a result, the photometric device 9 is of measuring the light intensities while segmenting substantially the entire surface of the field.

Furthermore, the photometric areas used are selected with a setting by a photometric mode setting portion 21. To be specific, when an AMP mode is selected, photometric outputs of all the 240 areas are used for a calculation. When a CW mode is selected, only 52 photometric areas in the vicinity of the center of the field shown in FIG. 3 are employed. When an SP mode is selected, only 4 areas of the central portion of the field are used.

Figure 4:
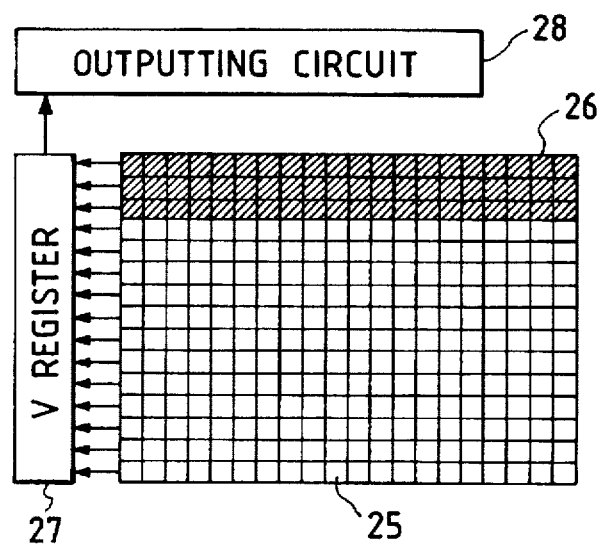
FIG. 4 is a diagram showing a structure of the photometric device in this embodiment.

FIG. 4 is a view showing an easy-to-understand structure of the photometric device 9.

An imaging pixel portion 25 is constructed of a photoelectric converting portion, wherein the imaging pixel portion 25 is segmented into 12 pixels in the vertical direction and 20 pixels in the horizontal direction. A correction pixel portion 26 adjacent to the imaging pixel portion 25 is shown by blackened oblique lines in FIG. 4. The correction pixel portion 26 is segmented into three pixels in the vertical direction and into 20 pixels in the horizontal direction. The arrangement is such that the photoelectric converting portion is constructed in substantially the same manner as the imaging pixel portion 25, light-shielded. Outputs of the correction pixel portion 26 are used for correcting a dark current and an amplifier gain. The correction of the amplifier gain are not concerned directly with the present invention and are therefore omitted in its explanation. The correction of the dark current will be, however, discussed later.

When the accumulation has been finished, data about electric charges of the imaging pixel portion 25 and the correction pixel portion 26 are transferred line by line to a V-register 27 by unillustrated H-registers disposed adjacent to the respective pixels. Further, the electric charge data are outputted pixel by pixel to an outputting circuit 28 by the V-register. After converting the electric charge outputs of the individual pixel signals into voltages the outputs are amplified by a 1-fold (a gain L) amplifier or a 4-fold (a gain H) amplifier. The outputting circuit 28 thereafter outputs the amplified voltages from the photometric device 9.

Figure 5:
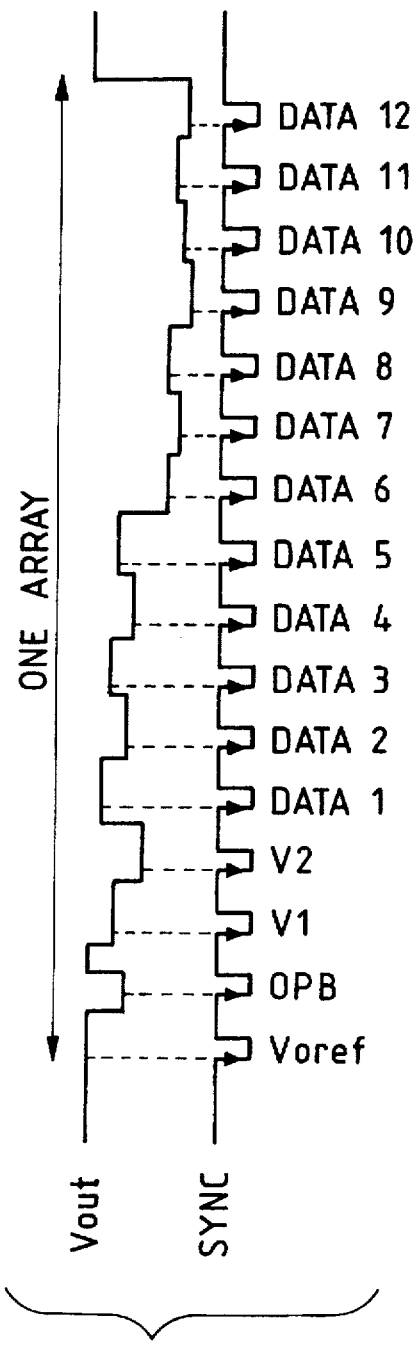
FIG. 5 is a diagram showing an output sequence of photometric outputs of the photometric device in this embodiment.

FIG. 5 is a diagram showing a signal mode of the output signal outputted from a terminal Vout of the photometric device 9 in accordance with this embodiment.

FIG. 5 shows signals for one line of the V-register. Each output signal is taken synchronizing with a rise of a synchronous clock SYNC for taking in the signal. To begin with, a reference voltage Voref is outputted. A signal component of each pixel appears in a low-potential direction on the basis of the reference voltage Voref. Accordingly, the respective pixel signals are all obtained as a difference from the reference voltage Voref.

Next, a dark current signal Vopb is outputted. Executed thereafter is a process of clamping again this Vopb component to the Voref level. Accordingly, all the outputs after this process are given forth in such a form that this Vopb component is subtracted.

Subsequently, outputs V1, V2 for correcting the amplifier gain are given forth, and thereafter twelve pieces photometric data are outputted, thus completing the outputting for one line. This operation is repeated 20 times, thereby completing a reading process for one picture.

Figure 6:
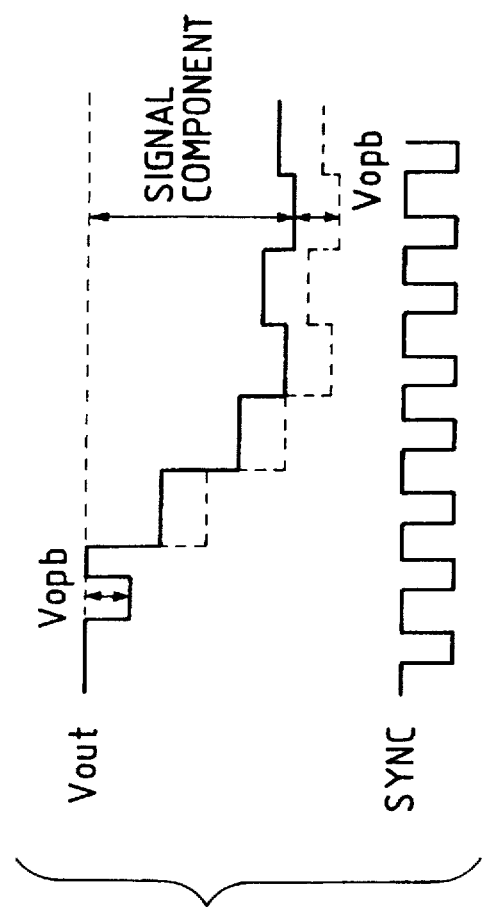
FIG. 6 is a diagram showing a photometric output level of the photometric device in this embodiment.

FIG. 6 is a diagram showing a relationship between Vopb and an output dynamic range of the photometric device 9.

As already stated before, after outputting Vopb, there is again performed the clamping to the Voref level, whereby the outputs after V1 are all, as indicated by a solid line, given forth in such a form that the Vopb component is removed. If the clamping is not effected, however, the output might have become as indicated by the dotted line. The output dynamic range of the photometric device 9 is restricted by a sum of reach signal output of Vopb in terms of a construction of the outputting circuit. That is, the output comes to an upper limit just when the output value shown by the dotted line reaches a saturation voltage. Hence, the output dynamic range of the photometric component becomes smaller with larger Vopb.

FIGS. 7A, 7B, 7C and 7D are explanatory diagrams showing a method of controlling the charge time in this embodiment.

Shown on the left side in FIGS. 7A, 7B, 7C and 7D are a flickering situation of a light source, a length of the charge time and a timing, while the right hand shows a photometric output (the maximum value within the 240 segmented areas) at that time. A charge time of the next time is calculated based on the charge time and the photometric value of the last time so that a photometric value of the next time approximates a target value.

Figure 7A:
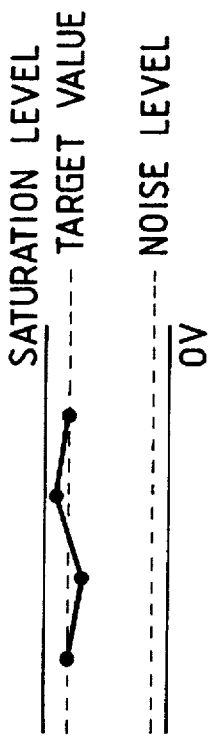
FIGS. 7A, 7B, 7C and 7D are explanatory diagrams each showing a relationship between a light source, a charge time and a photometric output.

First of all, FIG. 7A shows a case where no flicker is caused in the light source. In this case, the light source is stable, and hence the photometric value is also stable, thereby obtaining a value approximate to the target value.

Figure 7B:
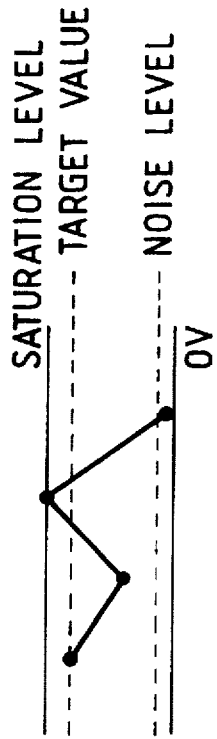

Next, FIG. 7B shows a case where flicking is caused in the light source, and where beside a photometric interval is a multiple of approximately an odd-number/2 of a flicker frequency. In this case, even if the first photometric value becomes coincident with the target value, the photometric value might be under the target value at a trough of the flickers in the next photometric process. Then, in the next photometric process, the charge time elongates to increase the photometric value, and hence the photometric value becomes over the target value this time. Further in the photometric process subsequent thereto, the charge time is shortened once again, and the photometric value becomes under the target value. Hereafter, this operation is repeated, and an extremely unstable result will come out.

Figure 7C:
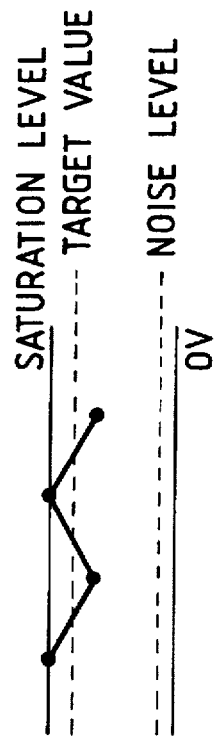

FIG. 7C therefore shows a case where the value of the next charge time obtained in FIG. 7B is processed to obtain a weighted mean with respect to the charge time value of the last time, and is stabilized so that the charge time does not abruptly change. A weight of the weighted mean may be properly adjusted. With this adjustment, the charge time never oscillates.

A fluctuation in the photometric value due to the flicker still remains, and, as the case may be, it may happen that the photometric value reaches the saturation level.

Figure 7D:
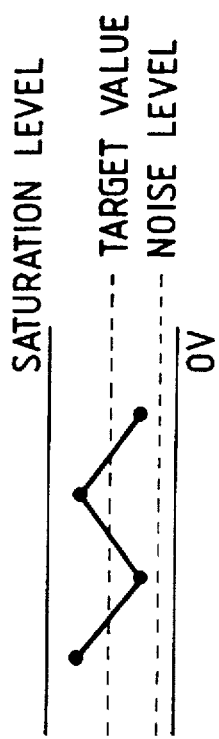

Then, FIG. 7D shows a case where the target value is set slightly low. Referring to FIG. 7D, although the fluctuation due to the flicker is left, the precise photometric data are obtained without any saturation of the photometric value because of the target value having been set relatively low.

Figure 8:
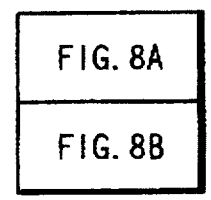
FIG. 8 is comprised of FIGS. 8A and 8B illustrating a flowchart showing an algorithm in this embodiment.
Figure 8A:
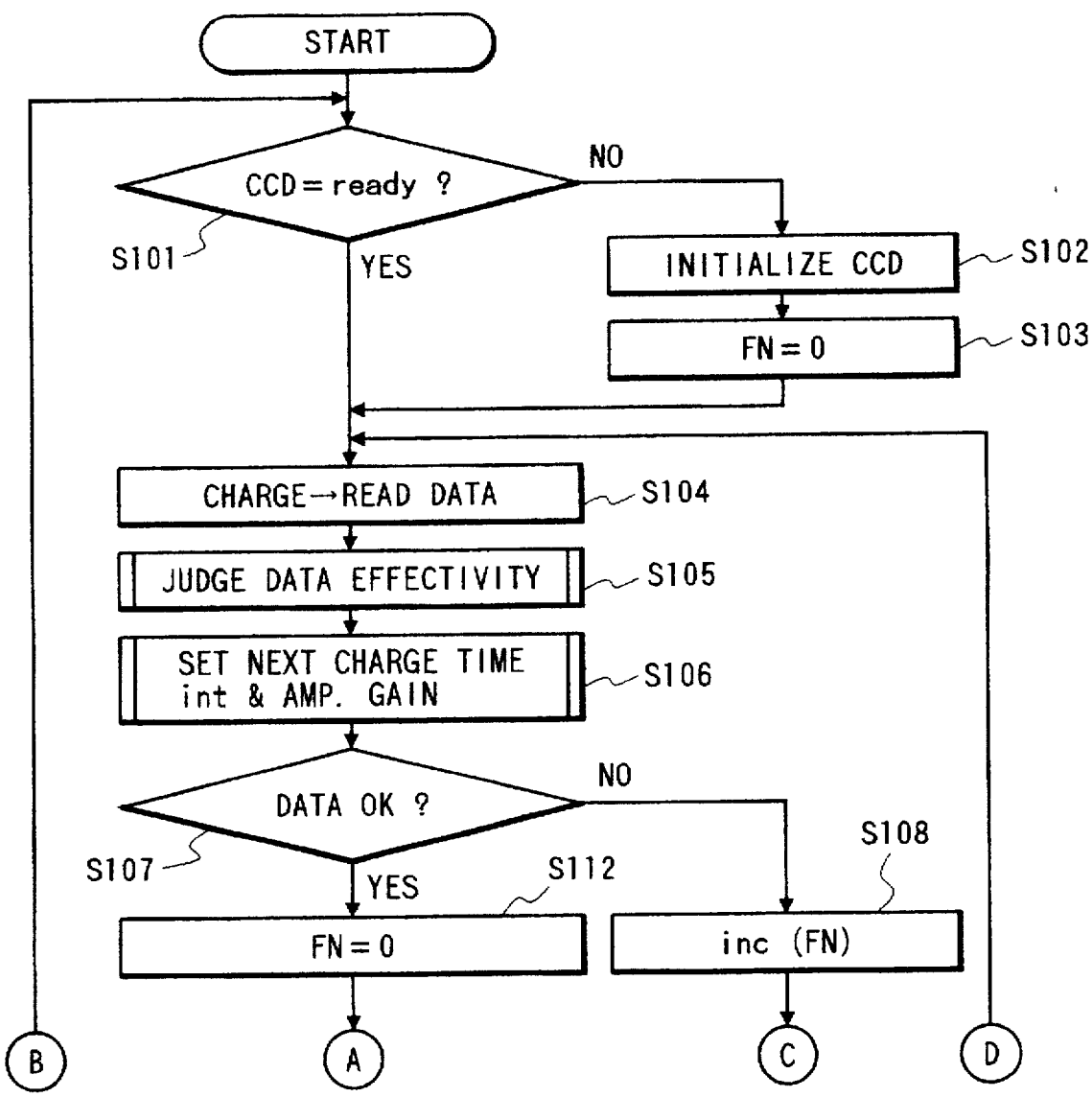
Figure 8B:
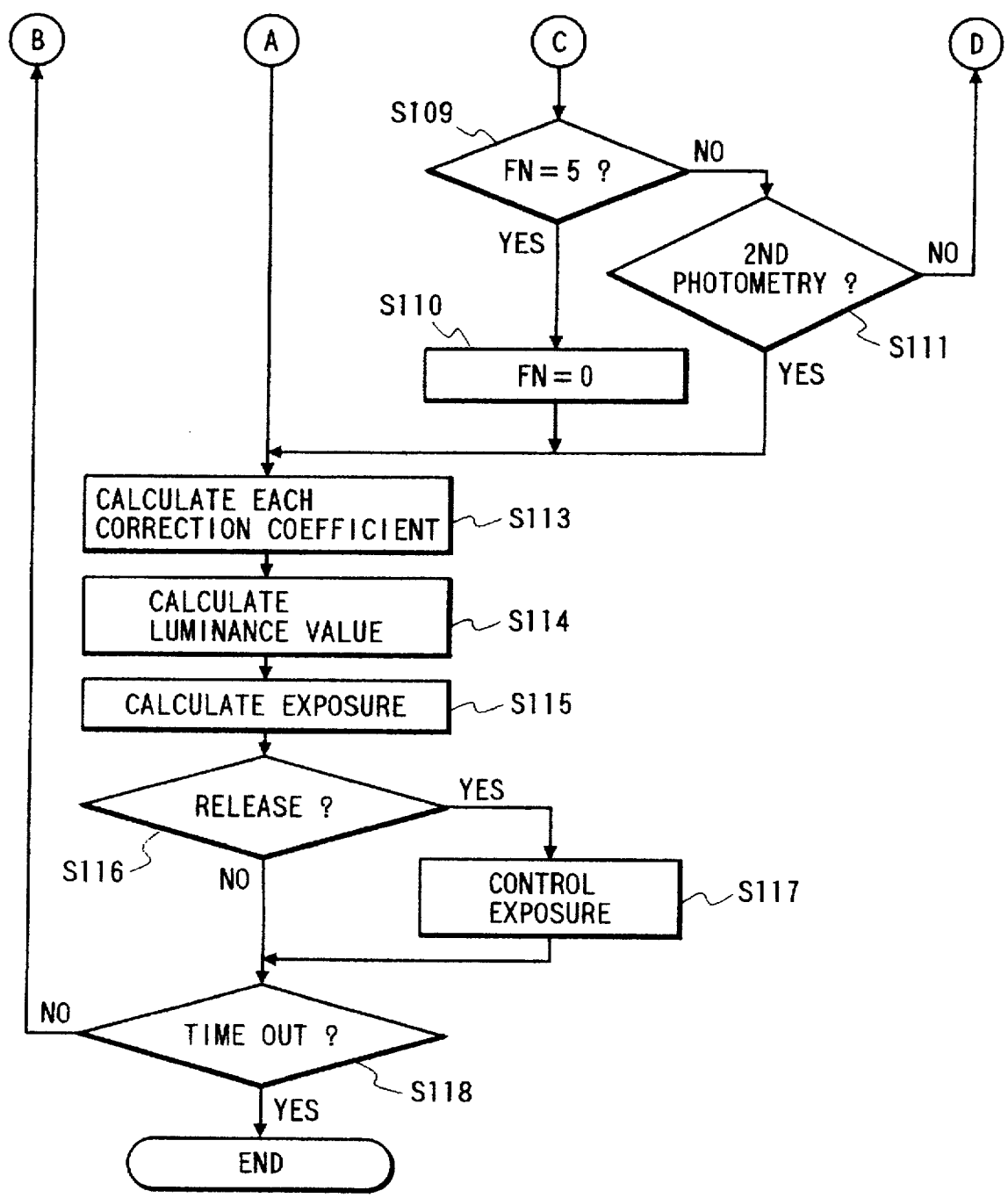

FIGS. 8A and 8B comprise a flowchart showing a program of the microprocessor 20.

A power supply of the camera is switched ON upon a half-stroke depression of the unillustrated release button of the camera, and the main program is executed.

To begin with, whether the photometric process is the first after switching ON the power supply, is checked in step S101. In the case of being the first photometric process, the photometric device 9 is initialized in step S102 and a gain of the outputting circuit 28 is set to L, and the charge time t is set to 10 mS. The charge time t of 10 mS corresponds to approximately one flicker period. The reason for this is that if the charge time is set as long as the flicker period, intensities of the flickers are offset during the charging process, thereby making it feasible to obtain the photometric value that is hard to be influenced by the flickers. Particularly in the first photometric process, a condition under which to execute the photometric process can not be known, and hence it is of much importance to obtain the photometric value undergoing no influence of the flickers in terms of thereafter performing the stable photometric process.

Thereafter, FN defined as a photometric loop variable is initialized to 0 in step S103.

If not the first photometric process, the photometric process is executed for the set charge time in step S104, and the photometric data about each of the 240 segmented areas is read out. Next in step S105, whether the obtained photometric data is effective or not is determined. The way of determination will be explained later (see FIG. 9).

In step S106, a combination of a charge time when in the next photometric process and amplifier gains (H/L) of the photometric device 9, is determined. The way of obtaining the amplifier gain and the charge time of the next time will hereinafter be explained (see FIGS. 10A and 10B).

Whether or not the photometric data of this time are effective is checked in step S107. If effective, the variable FN is cleared to 0 in step S112, and the processing proceeds to step S113. If not effective, FN is incremented by 1 in step S108.

Whether FN=5, i.e., whether or not a photometric error continues five times is checked in step S109. If FN=5, the photometric output is not updated for a long period of time. Hence, there must be a possibility in which the photographer thinks that the camera has a trouble. This is undesirable in terms of performance thereof, and therefore, even if the data are not effective, the exposure control value is updated by performing a calculation subsequent thereto. Hence, FN is cleared in step S110, and the processing thus proceeds to next step S113.

Whereas if the relationship of FN=5 is not established, whether or not the photometric process is the second after switching ON the power supply is checked in step S111. When switching ON the power supply, the exposure value that should be controlled is not yet obtained during such a period that the photometric process is not yet completed. Accordingly, the exposure is uncontrollable during this period, and therefore the exposure must be inhibited even when the photographer pushes the release button. If the exposure inhibition period elongates, the camera lacks a quick photographing property, and it may happen that the photographer considers that the camera is broken. This is also undesirable in terms of the performance. Then, if the photometric process is the second after switching ON the power supply, for the purpose of minimizing the exposure inhibition period, the processing proceeds to step S113 so as to calculate a given exposure control value even when the data effectiveness is not secured.

The reason why such a process is executed at the time of not the first but the second photometric process will be elucidated as follows. When performing the first photometric process, as stated in step S102, the charge time is fixed to 10 mS. Therefore, there must be a comparatively small probability that the data become effective upon the first photometric process. When executing the second photometric process, the charge time is adjusted based on the photometric data of the first time, and the probability of the data being effective is therefore high. For this reason, if the data of the first time are not effective, the photometric process is directly immediately reexecuted. Then, the processing is forced to proceed to next step in order to secure the quick photographing property when effecting the second photometric process.

Note that though not carried out herein, for instance, if the data are effective when performing the first photometric process but ineffective for some reasons when in the second photometric process, the exposure control value has already been calculated by use of the photometric data of the first time, and the photometric process may be executed as far as this case is concerned when the data of the second time are not effective.

If negative in step S111, the processing returns to step S104 in which the charging process is reexecuted.

In step S113, respective pieces of correction data for correcting the amplifier gain, etc. of the photometric data are calculated. These pieces of correction data are not concerned directly with the present invention and are therefore omitted in explanation.

In step S114, an absolute luminance value in each photometric area is calculated based on the obtained photometric data. Then, in step S115, a proper exposure value of the field is calculated based on the obtained absolute luminance value. The way of obtaining the proper exposure value is described in detail in Japanese Patent Laid-Open Application No. 6-95200 by the present applicant, and hence its explanation is omitted herein.

In step S116, whether or not the unillustrated release button is fully pushed is checked. In this case, the film is exposed based on the thus obtained proper exposure value in step S117. Thereafter, if not fully pushed, the processing proceeds directly to step S118. In step S118, a half-push timer determines whether or not a predetermined time elapses after canceling the half-stroke depression. If in the duration of the half-stroke depression or if within the predetermined time, the processing returns to step S101 and is repeated therein. If out of timer, the program comes to an end.

Figure 9:
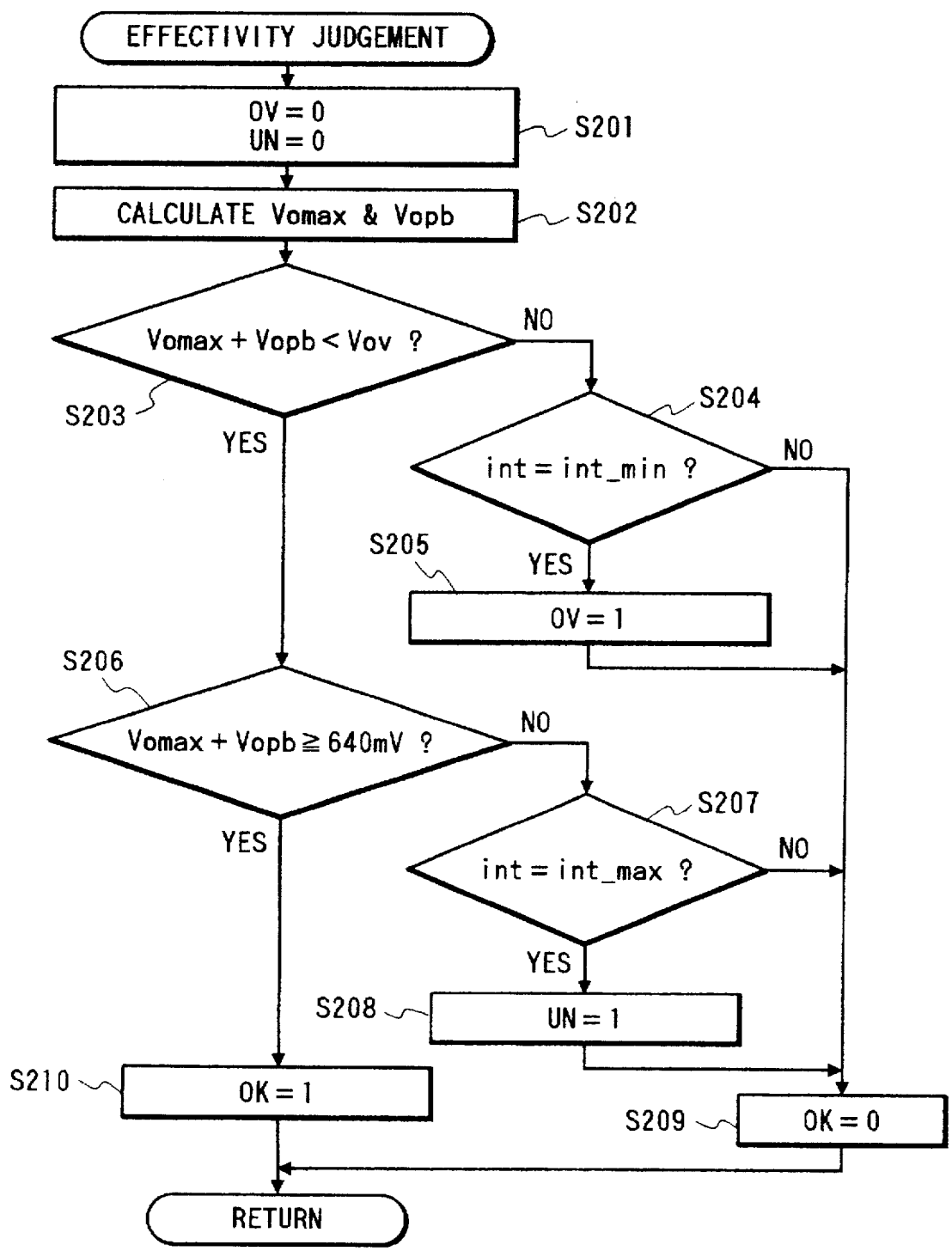
FIG. 9 is a flowchart showing an algorithm in this embodiment.

FIG. 9 is a flowchart showing a subroutine for determining the effectiveness of the photometric data.

Step S105 in FIG. 8A is executed, whereby the main subroutine is called and then executed.

First of all, in step S201, an overflow flag OV and an underflow flag UN are cleared to 0. Next, in step S202, Vomax and Vopb are obtained. Vomax is defined as photometric data of such an area that the signal component is maximum among pieces of photometric data of the 240 segmented areas, while Vopb is defined as a Vopb output existing in the same line as the photometric area in which Vomax exists.

For example, if Vomax exists in the data 1 through data 12 shown in FIG. 5, Vopb becomes OPB shown in FIG. 5.

Determined next in step S203 is whether or not the formula (1) shown as below is established.

$$Vomax + Vopb < Vov \qquad (1)$$

where Vov is a saturation output voltage value of the photometric device 9 and is stored in an unillustrated non-volatile memory within the camera for every gain H and every gain L. As already explained, the output of the photometric device 9 is given forth in such a form that the dark current component is previously subtracted, and hence a total of the signal component and the dark current component is unable to exceed the saturation output voltage value of the photometric device 9. Accordingly, when determining whether the signal is saturated or not, there must be a necessity for making a comparison with a value obtained by taking a sum of the signal component and the dark current component. If the formula (1) is established, the processing proceeds to step S206. Whereas if not established, the processing proceeds to step S204.

Determined in step S204 is whether or not a charge time int of the last time is equal to a predetermined minimum charge time int__min. Then, if the charge time is the minimum charge time, the processing proceeds to step S205 wherein 1 is substituted into the overflow flag OV, and proceeds further to next step. The minimum charge time int__min takes a numerical value on the order of, e.g., 10 μS.

In step S206, whether or not the following formula (2) is established is checked.

$$Vomax + Vopb \geq 640 \, mV \qquad (2)$$

where 640 mV on the right side is a value on the assumption that the saturation output voltage of the photometric device 9 takes 3V to 4V. For example, when the saturation output voltage of the photometric device 9 is 3.5V, it is more possible for the area ranging from a bright portion to a dark portion within the field to fall within the photometric dynamic range as the left side of the formula (2) takes a value that is more approximate thereto, with the result that a good photometric result with a wider dynamic range can be acquired.

When the value of the left side becomes smaller, however, the output of the portion much darker than that becomes by far smaller, and it follows that a precise photometric result can not be obtained because of being intercepted by noises. Then, it is required that the value of the left side be set enough to provide an effective photometric result. Herein, this value is set to 640 mV.

If the formula (2) is affirmative, the processing proceeds to step S210, wherein 1 is substituted into a flag OK indicating the effectiveness, thus finishing the process. Whereas if not affirmative, the processing proceeds to step S207, wherein whether or not the charge time int of the last time is equal to int_max, i.e., the predetermined maximum charge time, is determined. Then, if the charge time is the maximum charge time, the processing proceeds to step S208 in which 1 is substituted into the underflow flag UN. Then, the processing proceeds to step S209, wherein 0 is substituted into the effective flag OK, thus finishing the process. The maximum charge time int_max takes a numerical value on the order of, e.g., 100 mS.

Herein, the effectiveness determination made in step S107 in FIG. 8A is fundamentally done depending on whether OK=1. Even if OK=0, however, when OV=1 or UN=1, they are respectively a photometry upper limit and a photometric lower limit. Hence, even if not effective, that is conceived as a photometric limit, and the processing proceeds to next step without reexecuting the photometric process.

Figure 10B:
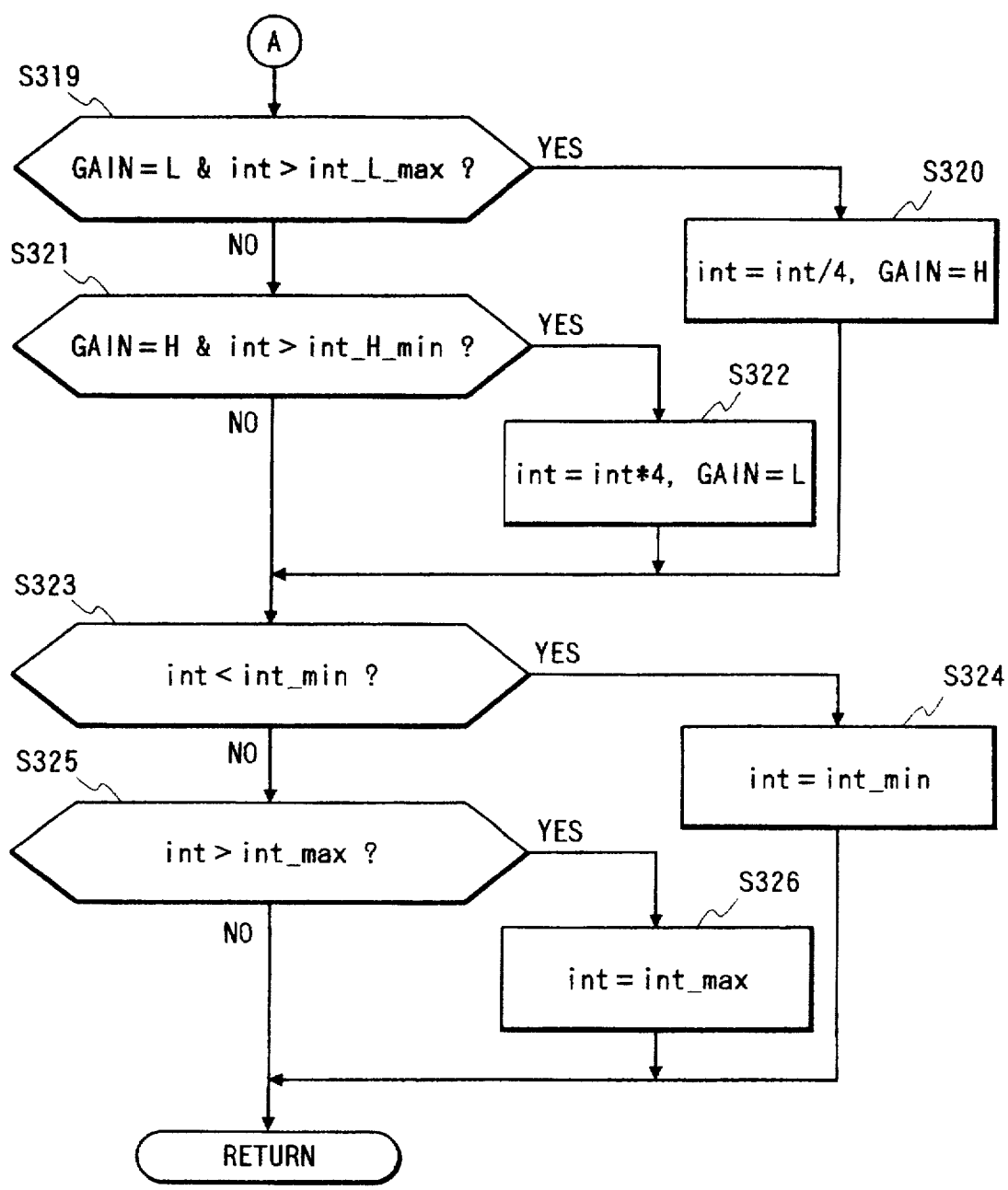
FIG. 10 is comprised of FIGS. 10A and 10B illustrating a flowchart showing an algorithm in this embodiment.

FIGS. 10A and 10B comprise a flowchart showing a subroutine for obtaining the charge time int of the next time and the amplifier gain.

The main subroutine is called and executed by executing step S106 in FIG. 8A. Before calling the main subroutine, the photometric process has been performed at least once after switching ON the power supply, and therefore the photometric data just anterior thereto are left in an unillustrated memory within the microprocessor 20.

In step S301, as in the same way with step S203 in FIG. 9, the determination of the formula (1) is made, i.e., whether or not the maximum value of the signal output is saturated, is determined. If the formula (1) is affirmative, the processing proceeds to step S302, wherein whether or not the photometric data stored in the memory are related to the photometric process that is the first after switching ON the power supply. If so, the processing proceeds to step S303, in which whether Vomax<40 mV is checked. If Vomax is smaller than 40 mV, it is anticipated that the field is considerably dark.

Now, supposing that the release button is fully pushed immediately when switching ON the power supply, it is required that a proper exposure value be outputted as soon as possible. Therefore, in this case, as shown in step S304, the gain of the photometric device 9 is set to H, and the charge time of the next time is unconditionally determined to be 40 mS. This numerical value of 40 mS is determined in accordance with the photometric system in use, as a charge time enough to cover a range from the photometric lower limit demanded in the photometric apparatus of the camera to a brightness undetectable by the first photometric process as much as possible. Accordingly, this numerical value may be determined as an optimal value from the quick photographing property demanded in the camera, a lower luminance limit demanded in the photometric apparatus and a brightness in the photometric system.

If Vomax is 40 mV or above in step S303, the charge time of the next time can be optimized by a calculation, and therefore the processing proceeds to step S305. In step S305, whether Vomax=0V is checked. If so, the charge time of the next time is set four times as large as that of the last time in step S306.

If step S305 is negative, a charge time candidate value int' of the next time is obtained by the following formula (3) in step S307.

$$int'=int.(Vagc.X)/(Vomax+Vopb) \quad (3)$$

What int' given by the formula (3) means is that Vomax+Vopb obtained when effecting the next photometric process is equalized to Vagc.X by performing the next photometric process using the charge time candidate value int' on the assumption that the brightness of the field in the last photometric process is equal to that in the next photometric process.

Figure 11:
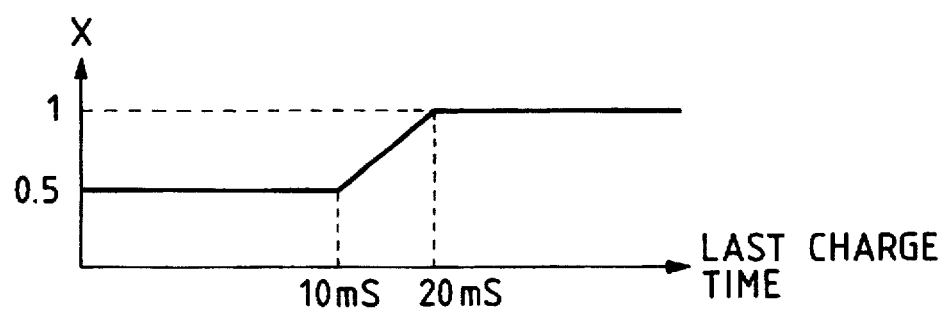
FIG. 11 is a graph showing a value taken as a variable in this embodiment.

Herein, int is a charge time of the last time, and Vagc is a target value of Vomax+Vopb and is set based on a saturation output voltage Vov of the photometric device 9 and also stored in the unillustrated non-volatile memory within the camera. When, for instance, Vov=3.5V, Vagc is set to approximately 3V slightly small than 3.5V. The symbol X is a target value correction coefficient in the case of anticipating a dispersion in terms of the photometric data due to the flickers and takes value as shown in FIG. 11 in accordance with the charge time int of the last time.

A flicker period of an Ac power supply is 10 mS in 50 Hz areas and approximately 8.3 mS in 60 Hz areas. Generally, influences of the flickers must be taken into consideration to such an extent that the charge time corresponds to approximately the flicker period, which takes herein a larger value, i.e., about 10 mS. Hence, X takes a value as small as 0.5. Thereafter, the influences of the flickers are gradually reduced, and therefore X also gradually increases and completely comes to 1 just when the flicker period is 20 mS. To consider this while being applied to the formula 3, if the charge time is 10 mS or under, the photometric target value is 1.5 V and 3 V in the case of being 20 mS or larger. The target value gradually varies in the middle therebetween. The reason why it is better for the photometric target value to change depending on the degree of the flicker, is obvious as elucidated in FIGS. 7A, 7B, 7C and 7D. Note that the X value is desirably optimized by the photometric system of the camera and a characteristic of a target light source and is not therefore limited to the values shown in FIG. 11.

Figure 12:
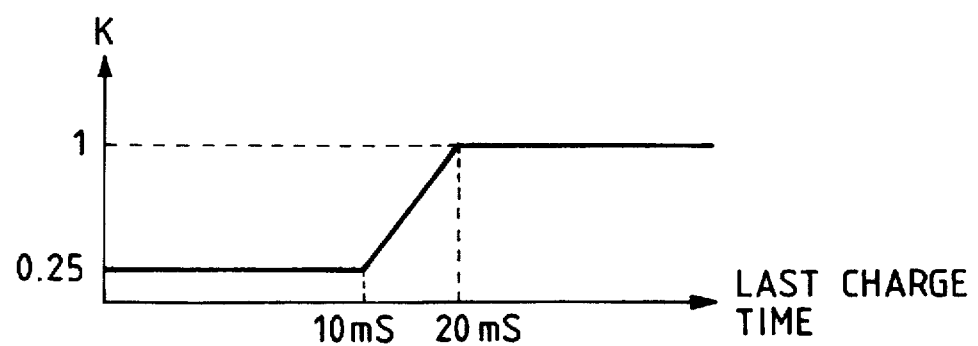
FIG. 12 is a graph showing a value taken as a variable in this embodiment.
Figure 13A:
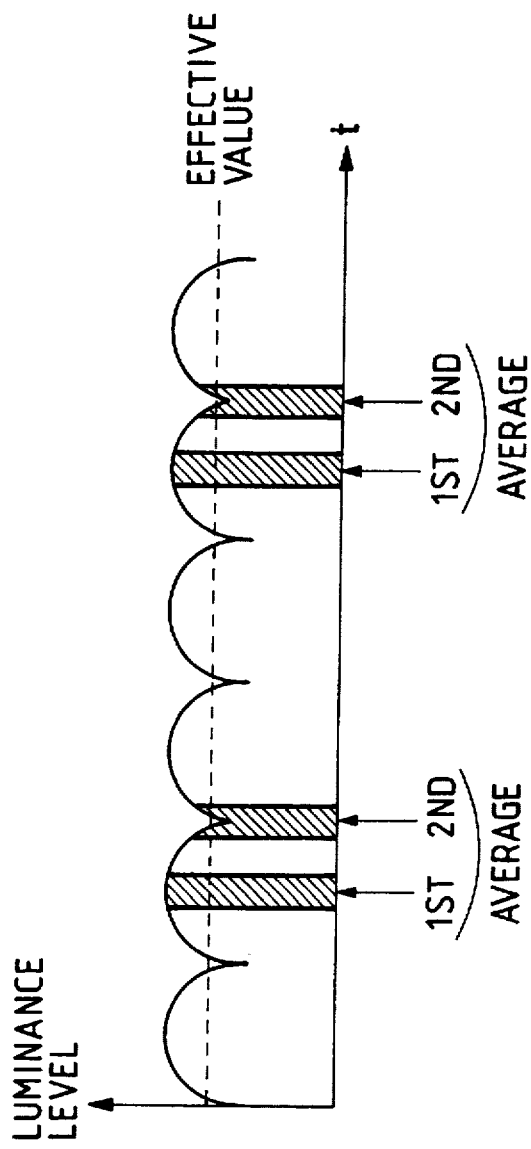
FIGS. 13A and 13B are explanatory diagrams showing a prior art.
Figure 13B:
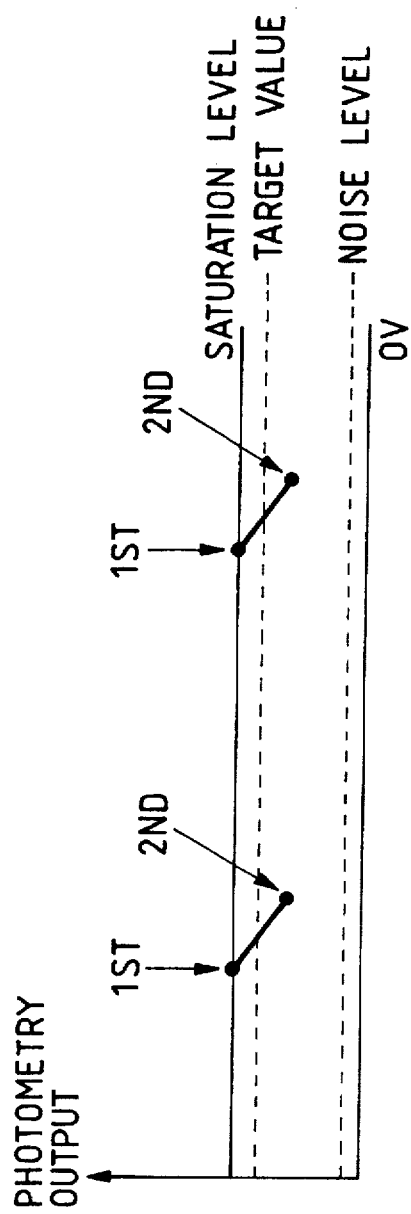

Next, in step S308, the charge time of the next time is determined by the formula (4) which follows:

$$int=K.int'+(1-K).int \quad (4)$$

where int' is the value obtained in step S307, int is the charge time of the last time, and K is the stability coefficient for preventing the charge time from abruptly changing and is a variable taking a value as shown in FIG. 12 in accordance with the charge time of the last time. To consider this while being applied to the formula (4), if the charge time is 10 mS or under, K=0.25, and hence the charge time of the next time becomes a weighted mean at such a rate that 3 (int) versus 1 (int').

Further, when the charge time is 20 mS or larger, there are almost no influences of the flickers, and therefore K=1, resulting in a value of 100% int'. When the charge time takes a value between 10 mS and 20 mS, the K value gradually varies. The reason why it is better for the charge time not to change so much depending on the degree of the flicker is elucidated as given in the discussion in FIGS. 7A, 7B, 7C and 7D.

Note that the K value is desirably optimized depending on characteristics of the light source serving as a target and the photometric system of the camera and is not therefore confined to the values shown in FIG. 12.

If the determination of the formula (1) in step S301 is negative, the processing proceeds to step S309, and the number of overflow areas among the 240 segmented areas is counted and substituted into a variable ovf. Herein, the overflow is determined depending on whether or not a sum of the signal output plus the dark current output of that area reaches Vov. A minimum value of ovf is 1 (the saturation area is only one), and a maximum value is 240 (all the segmented areas are overflow areas).

Whether ovf<15 is checked in step S310. If so, the charge time int of the next time is set one-half the charge time of the last time in step S311. Subsequently in step S312, whether ovf<30 is checked. If so, the charge time of the next time is set one fourth the charge time of the last time in step S313. Next, whether ovf<60 is checked in step S314. If so, the charge time int of the next time is set one eighth the charge time of the last time in step S315. Subsequently, whether ovf<120 is checked in step S316. If so, charge time int of the next time is set one sixteenth the charge time of the last time in step S317. If ovf is 121 or larger, the charge time int is set to 20 μS in step S318.

That is, in steps S310 through S318, the field is conceived brighter with a larger number of overflow photometric areas, and the charge time of the next time is set shorter than the last time.

Determined in step S319 is whether a relationship between the charge time in the next photometric process and the gain becomes int>int__L__min, wherein the gain is set to L. Herein, int__L__min is a threshold value for changing over the gain, and a numerical value on the order of 40 mS may be substituted thereinto. If the condition in step S319 is satisfied, the processing proceeds to step S320. Then, the gain is changed over to H when in the next photometric process, and the charge time int is set one fourth the value obtained above.

Determined, reversely, in step S321 is whether the int<int__H__min, wherein the gain is set to H. If so, the gain in the next photometric process is set to L, and the charge time is set four times as large as the value obtained above in step S322.

Herein, a numerical value on the order of 5 mS may be substituted into int__H__min. Further, as can be understood in the above example, it is desirable that a ratio of int__L__max versus int__H__min be a value that is over 4 times a gain H/L ratio. The photometric value can be thereby prevented from becoming unstable due to more gain changeovers than needed because of a hysteresis characteristic being yielded in the gain changeover even if there are more or less fluctuations in the photometric data.

In step S323, whether the charge time of the next time decreases under the predetermined minimum charge time int__min, is checked. If under int__min, the charge time is clipped to int__min in step S324.

Similarly, in step S325, whether or not the charge time of the next time exceeds the predetermined maximum charge time int__max, is checked. If over int__max, the charge time is clipped to int__max in step S326. Herein, the minimum and maximum charge times are set such as int__min=10 μS, and int__max=100 mS.

As discussed above in detail, according to the invention of the present application, the target value of the photometric output when determining the value of the charge time of the next time is changed depending on the value of the charge time of the last time. Hence, there increases the probability that photometric output value might fall within the photometric dynamic range even if the photometric output value of the last time gets unstable upon receiving the influences of the flickers. Accordingly, in the photometric apparatus using the charge type photometric device, even in such a case that the photometric output value is easy to become unstable because of the flickers being produced in the illumination light source, the photometric value can fall within the photometric dynamic range, and it is possible to obtain the stable photometric value.

According to the invention of the present application, the control is performed so that the maximum value of the photometric output approximates the target value. Therefore, the precise photometric outputs are obtained without any saturations of all the photometric outputs.

According to the invention of the present application, the target value is set smaller with a shorter charge time, and therefore it is feasible to obtain the precise photometric value for such a short charge time as to be relatively easy to be influenced by the flickers.

Another embodiment of the present invention will hereinafter be discussed with reference to the drawings.

Figure 14:
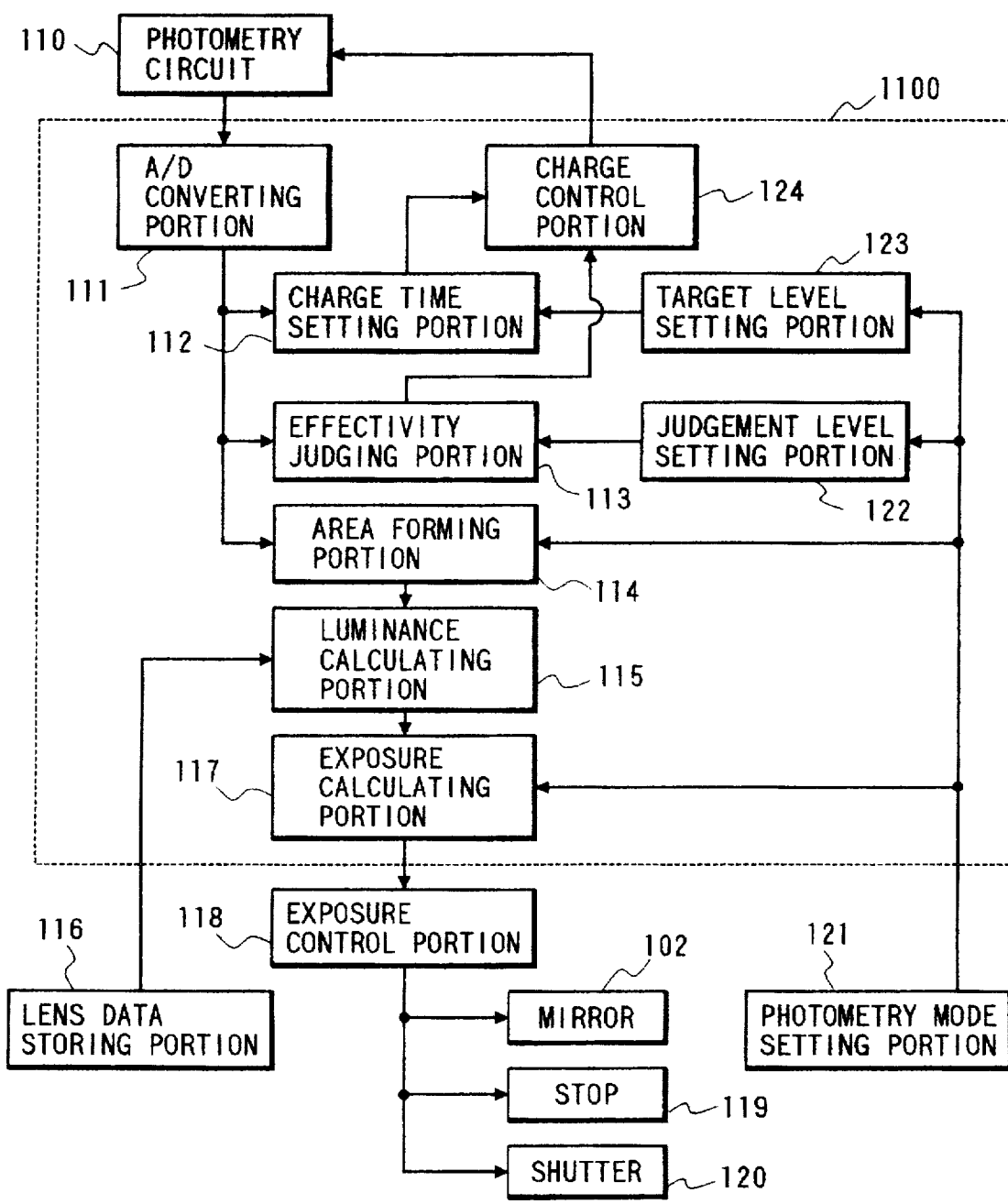
FIG. 14 is a block diagram illustrating a construction in another embodiment of the present invention.

FIG. 14 is a block diagram schematically illustrating a construction of the photometric apparatus of the camera in accordance with another embodiment of the present invention.

The photometric data outputted from a photometric circuit 110 are converted into numerical values by an A/D converting portion 111 and thereafter outputted to a charge time setting portion 112, an effectiveness determining portion 113 and an area forming portion 114.

The charge time setting portion 112 sets a charge time of a next time so that a photometric output value of the next time becomes a target value on the basis of an output from the A/D converting portion 111, an output from a target level setting portion 123 and the charge time of the last time. Then, the thus set charge time is outputted to a charge control portion 124. The method of obtaining the charge time of the next time will be explained in detail later.

The effectiveness determining portion 113 determines whether the photometric output of the last time is effective or ineffective on the basis of an output from the A/D converting portion 111 and an output from a determination level setting portion 122, and an output of which is connected to the charge control portion 124. The method of determining the effectiveness will be mentioned later.

The area forming portion 114 processes the output of the A/D converting portion 111 to form the photometric area corresponding to a photometric mode at that time based on the data given from the photometric mode setting portion 121. The data about the area formed by the area forming portion 114 is outputted to a luminance calculating portion 115.

The photometric mode setting portion 121 is capable of setting three kinds of photometric modes which follow. That is, a first mode is a division photometric mode (hereinafter referred to as an AMP mode) of dividing the field into a plurality of areas, calculating individual luminance values thereof and calculating a proper exposure value based on the plurality of luminance values thereof. A second mode is a center emphatic mode (hereinafter called a CW mode) of measuring emphatically a light intensity of the central area of the field. A third mode is a spot photometric mode (hereinafter termed an SP mode) of measuring a light intensity of a very narrow area of the field.

Figure 15:
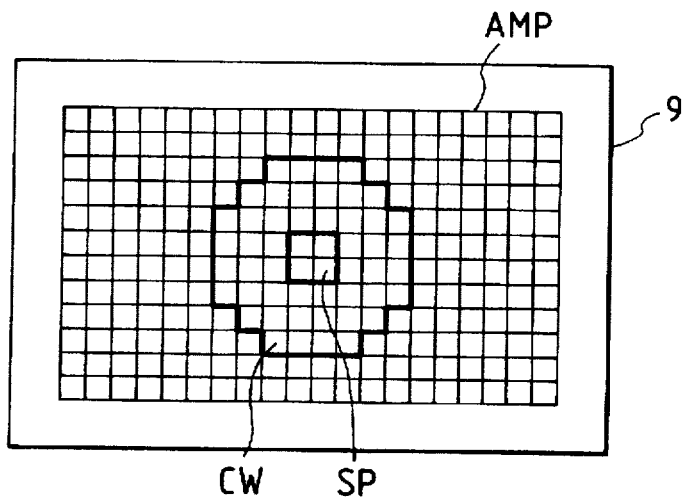
FIG. 15 is a diagram showing how the photometric device is divided in this embodiment.

In the case of the AMP mode, as illustrated in FIG. 15, the respective areas are all conceived as independent photometric areas for obtaining luminance values of all the 240 segmented areas. In the CW mode, a set of 52 segmented areas shown at the central portion in FIG. 15 are conceived as one area, and the photometric outputs thereof are averaged. According to the SP mode, four segmented areas of a more central area are conceived as one area, and the photometric outputs thereof are averaged.

The luminance calculating portion 115 calculates a luminance value per area by correcting the data of the areas formed by the area forming portion 114 on the basis of pieces of lens data about a focal length of the phototaking lens, an open aperture value, an exit pupil position and vignetting, which data are supplied from a lens data storing portion 116 incorporated into the phototaking lens.

An exposure calculating portion 117 calculates a proper exposure value based on a known method by calculating an exposure corresponding to the set photometric mode on the basis of the output from the luminance calculating portion 115 and the data given from the photometric mode setting portion 121.

An exposure control portion 118, upon pushing the unillustrated release button of the camera, exposes the film by controlling a mirror 102, a stop 119 and a shutter 120 on the basis of the proper exposure value obtained by the exposure calculating portion 117.

The charge control portion 124 controls the photometric circuit 110 to execute a next photometric process in accordance with a charge time set by the charge time setting portion 112. A timing of performing the charge is normally posterior to an end of the exposure calculation by the exposure calculating portion 117. If the effectiveness determining portion 113 determines that the photometric data of the last is ineffective, however, the next photometric process is immediately started without calculating the exposure.

The target level setting portion 123 sets an optimum photometric target level for every set photometric mode on the basis of the data given from the photometric mode setting portion 121, and outputs this target level to the charge time setting portion 112. Further, the determination level setting portion 122 similarly sets a fiducial value for determining optimum effectiveness per set photometric mode on the basis of the data from the photometric mode setting portion 121, and outputs this fiducial value to the effectiveness determining portion 113.

Herein, the A/D converting portion 111, the charge time setting portion 112, the effectiveness determining portion 113, the area forming portion 114, the luminance calculating portion 115, the exposure calculating portion 117, the determination level setting portion 122, the target level setting portion 123 and the charge control portion 124 are all actualized by microprocessors 1100 defined as control circuits. Programs in the microprocessors 1100 will be explained in greater detail afterward.

Figure 16A:
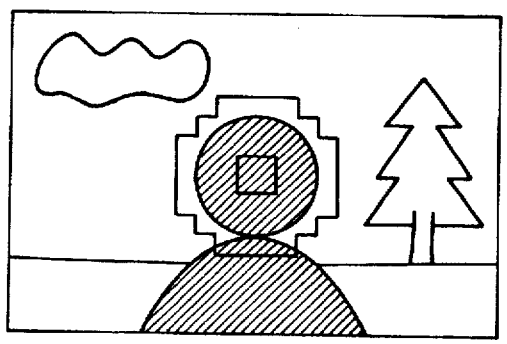
FIGS. 16A and 16B are diagrams for explaining a field and a photometric output.
Figure 16B:
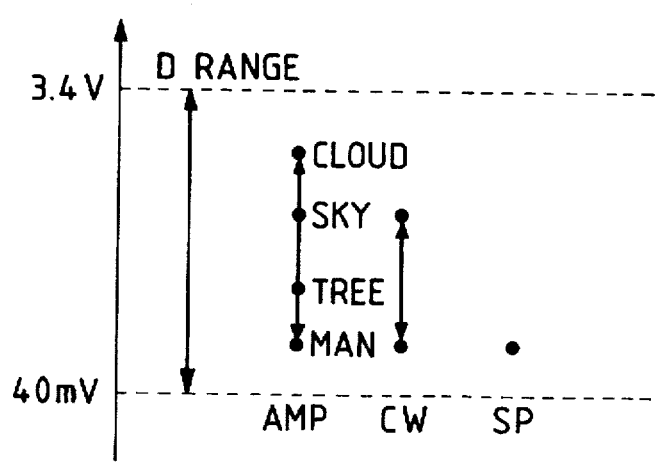

FIG. 16A is a view showing a composition of the field in the ordinary photography. FIG. 16B is a diagram of showing a relationship between an output dynamic range of the photometric device 9 and a luminance distribution within the field for an easier understanding.

Referring to a graph shown in FIG. 16B, the axis of ordinates indicates a photometric output, and the output dynamic range is provided between an output upper limit saturation level (3.4 V) and a lower limit noise level (40 mV). As far as the photometric output falls within this range, the luminance value can be calculated.

In the composition as shown in FIG. 16A, objects such as cloud, sky, a tree and a figure each having a different luminance, exist in the picture, and the respective photometric areas have different output levels. Now, the luminance distribution within the picture is assumed such that the cloud, as indicated by arrows in the AMP mode, exhibits the highest luminance, and the sky, the tree and the figure are sequentially ranked. In the AMP mode, outputs of all the photometric areas are employed, and therefore it is desirable that all these outputs should fall within the dynamic range.

In CW mode, as shown in FIG. 16A, since there are used only the outputs in the vicinity of the central area of the picture, the output distribution of the areas to be used is, as shown in FIG. 16B, narrower than in the AMP mode.

Further, in the SP mode, the output distribution thereof is much narrower than in the CW mode because of using only the range still narrower than in the CW mode.

Namely, as a general tendency, if the number of photometric areas in use decreases, it can be understood that the luminance distribution range thereof is also narrowed.

Figure 17:
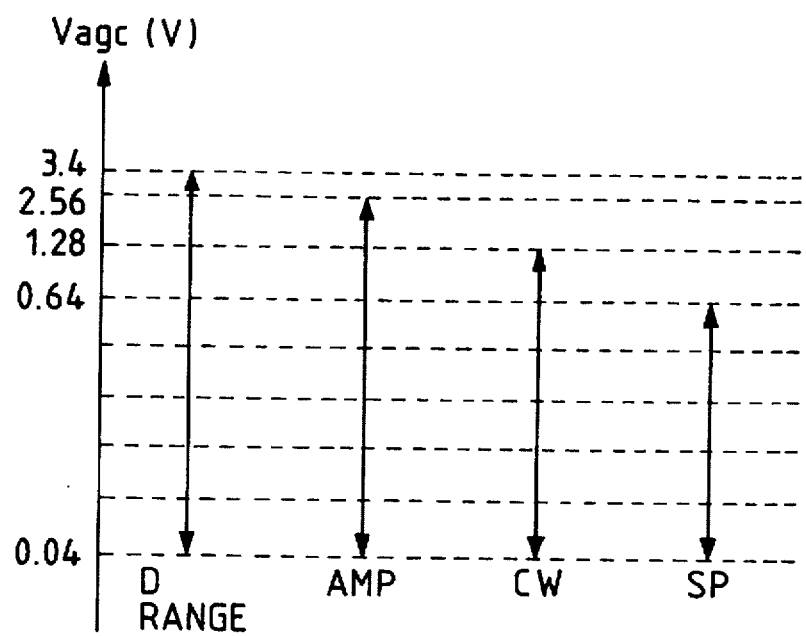
FIG. 17 is an explanatory diagram showing a relationship between the photometric output and the dynamic range.

FIG. 17 is an explanatory diagram showing the way of setting the charge time of the photometric device 9 in each of the photometric modes. Referring to FIG. 17, the axis of ordinates indicates an output voltage of the photometric circuit 110 in a logarithmic representation. A range shown by the arrows on the leftmost side is a photometric dynamic range.

In the AMP mode, as explained in FIGS. 16A and 16B, since there must be a high probability that a plurality of objects exhibiting different luminances exists in the picture, it is desirable that the setting be provided enough to exploit the dynamic range to the greatest possible degree. Accordingly, as illustrated in FIG. 17, the charge time of the next time is set based on the photometric output of the last time and the charge time as well so that an output maximum value comes in the vicinity of 2.56 V that is relatively high in level. The reason for setting not on the verge of the saturation level but to 2.56 V is that an output overflow is prevented by making allowances for some error.

The CW mode is considered to be narrower in the luminance range than the AMP mode, and hence the target of the maximum value is set in the vicinity of 1.28 V. Another reason for setting the value smaller than in the AMP mode is that the photometric output does not coincide with the target value as the case may be, and the output overflow is prevented in such a case.

For example, when measuring a light intensity of a so-called flicker light source in which the brightness pulsates corresponding to frequencies of the power supply as seen in a fluorescent lamp, the luminance of the light source in the photometric process of the last time is different from that in the photometric process of the next time due to the flickers. It is therefore quite difficult to precisely predict the optimum charge time.

Accordingly, if the target value is set comparatively low beforehand in consideration of such a case, the photometric output can be prevented from becoming ineffective due to the overflow even when the object luminance exceeds a predicted value. If the target value is set too low, however, the photometric output of the dark portion of the field is intercepted by the noise level, an exact photometric value can not be calculated, which might need cautions.

The SP mode is regarded even narrower in the luminance range than the CW mode, and therefore a target of the maximum value is further decreased and set in the vicinity of 640 mV. The reason why the set value is low is the same as that in the CW mode.

Figure 18:
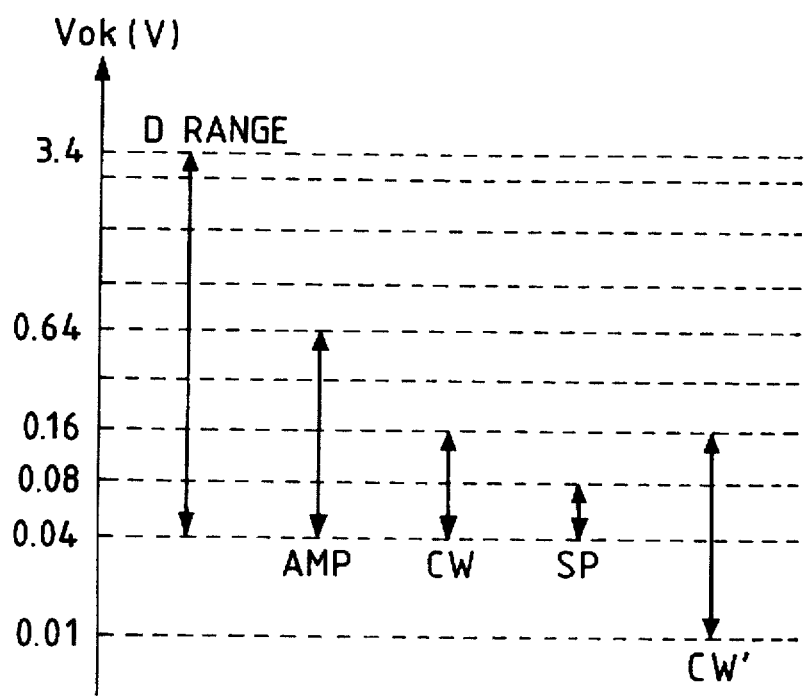
FIG. 18 is an explanatory diagram showing a relationship between the photometric output and the dynamic range.

FIG. 18 is a diagram showing a relationship between the photometric output of the photometric circuit 110 and the determination level of the photometric output effectiveness in each photometric mode. The axis of ordinates in FIG. 18 indicates the output voltage of the photometric circuit 110 in the logarithmic representation. The range indicated by the leftmost arrows is defined as a photometric dynamic range.

In the AMP mode, as explained in FIGS. 16A and 16B, there must be a high probability that a plurality of objects having different luminances exist in the picture, and it is desirable that the plurality of these objects be recognized as separate objects in terms of algorithm and their luminance values be calculable per photometric area. For this purpose, according to the AMP mode, it is required that the objects having a difference in luminance be within the photometric dynamic range as much as possible in one photometric process. Accordingly, the maximum value of the photometric output is required to take a high level to some extent.

As a matter of course, in such a case that the luminance difference within the field is small, and both of the object with the maximum luminance and the object with the minimum luminance, as indicated by A in FIG. 21, fall within the photometric dynamic range, it is of little importance that the maximum value is small.

As indicated by B in FIG. 21, however, if the photometric output of the low luminance object within the field decreases under Vun defined as a noise level, it is impossible to calculate an accurate luminance of the object.

As discussed above, in the AMP mode, it is required that the luminances of the plurality of objects within the field be calculated. Hence, in the case indicated by B in FIG. 21, if the maximum value of the photometric output is under a certain level, it is better to regard that piece of photometric data ineffective. As shown in FIG. 18, the level thereof is herein set to 640 mV.

When in the CW mode, the conditions are more or less different from those in the AMP mode. According to the CW mode, as already explained, the photometric areas to be used appear as if being one photometric area by adding all the photometric outputs within these photometric areas. Therefore, the values of the photometric outputs of the high luminance areas among the photometric areas exert overwhelming influences upon the added values.

For instance, it is assumed that the maximum value is, as indicated by CW in FIG. 18, 160 mV, and the minimum value is 40 mV of the noise level in a distribution of the outputs within the areas with respect to a certain object. In this case, the output of 40 mV does not decrease because of an existence of the noise components even when the object luminance is lower than that value.

Now, it is herein presumed that a half of the outputs within the areas are 160 mV, and a remaining half of the outputs are 40 mV. In fact, however, the output of 40 mV is by far smaller down to a level of 10 mV as indicated by CW' shown on the rightmost side in FIG. 18. According to the above-described calculating method of the CW mode, however, there is produced an error as slight as 0.24 EV between the output value indicated by CW and the output value of rightmost CW'.

Thus, in the CW mode, the output of the maximum luminance is dominant, and consequently a problem is hard to arise even when the output within the using area decreases under the noise level. Accordingly, the effectiveness determining level can be set lower in the CW mode than in the AMP mode. Herein, the level thereof is 160 mV.

It is anticipated that the SP mode, as described above, has a much smaller luminance difference within the areas than in the CW mode, and therefore the effectiveness determining level can be set still lower. Herein, a value thereof is 80 mV.

FIGS. 19A and 19B comprise a flowchart showing a program of the microprocessor 1100. The power supply of the camera is switched ON upon a half-stroke depression of the unillustrated release button of the camera, and the main program is executed.

To begin with, whether the photometric process is the first after switching ON the power supply, is checked in step S1101. In the case of being the first photometric process, the photometric device 9 is initialized in step S1102 and a gain of an outputting circuit 28 is set to L, and the charge time t is set to 10 mS. This charge time t of 10 mS corresponds to approximately one flicker period. If the charge time is set as long as the flicker period, intensities of the flickers are offset during the charging process, thereby making it feasible to obtain the photometric value that is hard to be influenced by the flickers. Particularly in the first photometric process, a condition under which to execute the photometric process is unknown, and hence it is of much importance to obtain the photometric value undergoing no influence of the flickers in terms of thereafter performing the stable photometric process.

Thereafter, FN defined as a photometric loop variable is initialized to 0 in step S1103. Further, in step S1104, a photometric counter n is set to 0.

If not the first photometric process, the photometric process is executed for the set charge time in step S1105, and the photometric data about each of the 240 segmented areas is read out.

The counter n is incremented by 1 each time the photometric process is executed in step S1106.

Next in step S1107, whether the obtained photometric data is effective or not is determined. The way of determination will be explained later with reference to a flowchart of the subroutine.

In step S1108, the charge time when in the next photometric process is calculated. The way of obtaining the charge time of the next time will hereinafter be explained in detail.

In step S1109, setting of the amplifier gains (H/L) of the photometric device 9 when in the next photometric process, is determined. The way of setting the gain will also hereinafter be explained in detail.

Next, in step S1110, whether or not the photometric data of this time are effective is determined based on a result of step S1107. If effective, the variable FN is cleared to 0 in step S1111, and the processing proceeds to step S1117. If not effective, FN is incremented by 1 in step S1112.

Whether FN=5, i.e., whether or not a photometric error continues five times is checked in step S1113.

If FN=5, the photometric output is not updated for a long period of time. Hence, there must be a possibility in which the photographer thinks that the camera has a trouble. This is undesirable in terms of performance thereof, and therefore, even if the data are not effective, subsequent calculations are performed. For updating the exposure control value, FN is cleared in step S1114, and the processing proceeds to next step.

Whereas if the relationship of FN=5 is not established, whether or not the photometric process is the second after switching ON the power supply, i.e., whether or not n=2, is checked in step S1115. If n is not 2, the processing returns to step S1105, wherein the next photometric process is immediately executed.

If n=2, the processing proceeds to step S1116, wherein there is determined whether FN=2, i.e., whether the photometric data are ineffective in both of two photometric processes after starting the photometric operation. If FN=2, the calculation of the proper exposure value is not yet completed once after switching ON the power supply, and hence an exposure value that should be controlled is not yet obtained. Accordingly, in that case, the exposure is uncontrollable. Therefore, even when the photographer pushes the release button, the exposure must be inhibited. If the exposure inhibition period elongates, the camera lacks a quick photographing property, and it may happen that the photographer considers that the camera is broken. This is also undesirable in terms of the performance. Then, for the purpose of minimizing the exposure inhibition period, the processing proceeds to step S1117 so as to calculate a given exposure control value even when the data effectiveness is not secured.

The reason why such a process is executed at the time of not the first but the second photometric process will be elucidated as follows. When performing the first photometric process, as stated in step S1102, the charge time is fixed to 10 mS. Therefore, there must be a comparatively small probability that the data become effective upon the first photometric process. When executing the second photometric process, the charge time is adjusted based on the photometric data of the first time, and therefore the probability of the data being effective is high. For this reason, if the data of the first time are not effective, the photometric process directly immediately reexecuted. Then, the processing is forced to proceed to next step in order to secure the quick photographing property when in the second photometric process.

If FN=2 is not established in step S1116, the photometric process gets successful once after switching ON the power supply, and there is no necessity for hurrying up because of having already finished calculating the proper exposure value first time. Then the processing returns to step S1105, and the photometric process is reexecuted.

Calculated in step S1117 are respective pieces of correction data for correcting the amplifier gain of the photometric data and the photometric output value of the photometric optical system. These pieces of correction data are not concerned directly with the present invention and are therefore omitted in explanation.

In step S1118, an absolute luminance value is calculated based on the obtained photometric data and correction value by a method corresponding to each set photometric mode. Then, in step S1119, a proper exposure value is calculated based on the obtained absolute luminance value by the method corresponding to each set photometric mode. The way of obtaining the proper exposure value is described in detail in Japanese Patent Laid-Open Application No. 6-95200 by the present applicant, and hence its explanation is omitted herein.

In step S1120, whether or not the unillustrated release button is fully pushed is checked. In this case, the film is exposed based on the thus obtained proper exposure value in step S1121. Thereafter, if not fully pushed, the processing proceeds directly to step S1122. In step S1122, the half-push timer determines whether a predetermined time elapses after canceling the half-stroke depression. If in the duration of the half-stroke depression or if within the predetermined time, the processing returns to step S1101 and is repeated therein. If out of timer, the program comes to an end.

Figure 20B:
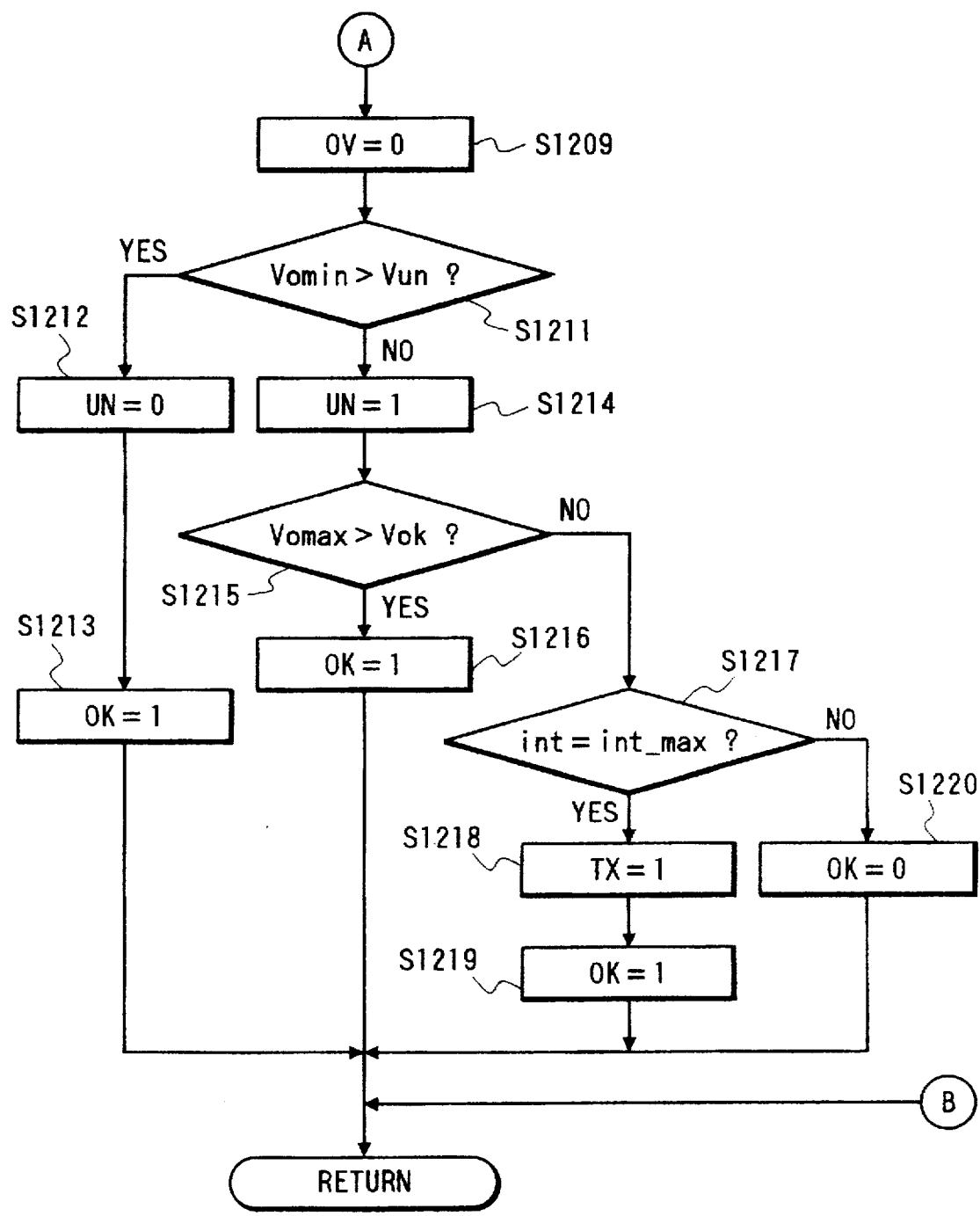
FIG. 20 is comprised of FIGS. 20A and 20B illustrating a flowchart showing an algorithm in this embodiment.

FIGS. 20A and 20B comprise a flowchart showing a subroutine for determining the effectiveness of the photometric data. Step S1107 shown in FIG. 19A is executed, whereby the main subroutine is called and executed.

First of all, in step S1201, flags TX and TN are cleared to 0. The flag TX is a flag in which "1" is set when the charge time reaches the maximum time. The flag TN is a flag in which 1 is set when the charge time reaches the minimum time.

Next, in step S1202, whether or not the set photometric mode is the AMP mode is checked. If not, the processing proceeds to step S1203, wherein whether the photometric mode is the CW mode or not is checked.

If determined to be the AMP mode, in step S1204, an effectiveness determination level Vok is set to 640 mV. If determined to be the CW mode, the processing proceeds to step S1205, the effectiveness determination level is set such as Vok=160 mV. In the case of being the SP mode, the processing proceeds to step S1206, wherein the effectiveness determination level is set such as Vok=80 mV.

Next, Vomax, Vopb and Vomin are obtained in step S1207. The symbol Vomax designates a piece of photometric data of an area in which the signal component of the photometric data is the maximum among the photometric areas to be used in each photometric mode.

All the 240 segmented areas are employed as the photometric areas when in the AMP mode. Fifty two segmented areas shown in FIG. 15 are used in the CW mode, and central four segmented areas are used in the SP mode. The symbol Vopb is defined as a Vopb output existing in the same line as the photometric area in which Vomax exists. For example, if Vomax exists in the data 1 through data 12 shown in FIG. 5, Vopb becomes OPB shown in FIG. 5.

Determined next in step S1208 is whether or not the formula (5) shown as below is established.

$$Vomax + Vopb < Vov \quad (5)$$

where Vov is a saturation output voltage value of the photometric device 9 and is stored in an unillustrated non-volatile memory within the camera for every gain H and every gain L. A standard value of Vov is about 3.4 V. As already explained, the output of the photometric device 9 is given forth in such a form that the dark current component is previously subtracted, and hence a total of the signal component and the dark current component is unable to exceed the saturation output voltage value of the photometric device 9. Accordingly, when determining whether the signal is saturated or not, there must be a necessity for making a comparison with a value obtained by taking a sum of the signal component and the dark current component.

If the formula (5) is established, the processing proceeds to step S1209 in which 0 is substituted into an overflow flag OV. Whereas if not established, the processing proceeds to step S1210 in which 1 is substituted into OV.

In step S1211, a determination of the following formula (6) is further made.

$$Vomin > Vun \quad (6)$$

where Vun is a noise voltage level value of the photometric device 9 and is stored in the unillustrated non-volatile memory within the camera for every gain H and every gain L. A standard value of Vun is about 40 mV.

If the formula (6) is established, as indicated by A in FIG. 21, both of maximum and minimum outputs fall within the photometric dynamic range, and hence 0 is substituted into the underflow flag UN in step S1212, and 1 is substituted into a flag OK indicating the effectiveness, thus finishing the process.

If the formula (6) is negative in step S1211, as indicated by B in FIG. 21, there is not an overflow but an underflow, so that 1 is substituted into the underflow flag UN in step S1214.

Subsequently, a determination of the formula (7) is made in step S1215.

$$Vomax > Vok \quad (7)$$

where Vok is a value substituted in step S1204 or S1205 or S1206 based on the set photometric mode.

If the formula (7) is affirmative, though in the underflow state, it is regarded that the dynamic range needed for calculating the proper exposure is secured, and 1 is substituted into OK in step S1216, thus finishing the process. Whereas if negative, in step S1217, whether or not the charge time int of the time concerned is int_max, i.e., a settable maximum charge time, is determined.

If determined to be the maximum charge time, the photometric output level can not be increased any more. Therefore, in step S1218, 1 is substituted into a maximum charge time flag TX, and 1 is substituted into OK in step S1219.

The flag TX indicates that the photometric dynamic range is not secured, and it is impossible to make a further level adjustment. Hence, when calculating the proper exposure, a special process can be also executed with reference to this flag. This is not, however, concerned directly with the present invention and is therefore omitted in explanation.

If negative in step S1217, 0 is substituted into OK in step S1220.

On the other hand, if negative in step S1208, 1 is substituted into overflow flag OV in step S1210, and the determination of the formula (6) is made in step S1221.

If affirmative in step S1221, as indicated by C in FIG. 21, the case shows, although in the overflow state, a non-underflow state. Whereas if negative, as indicated by D in FIG. 21, neither the overflow nor the underflow is present, and hence 0 or 1 is substituted into the underflow flag UN corresponding to the respective cases in steps S1222 and S1223.

Subsequently, in step S1224, whether or not the charge time int of the time concerned is int_min, i.e., a settable minimum charge time, is determined. If determined to be the minimum charge time, the photometric output level can not be decreased any more. Therefore, in step S1225, 1 is substituted into a minimum charge time flag TN, and 1 is substituted into OK in step S1226.

The flag TN indicates that the photometric dynamic range is not secured, and it is impossible to make a further level adjustment. Hence, when calculating the proper exposure, a special process can be also executed with reference to this flag. This is not, however, concerned directly with the present invention and is therefore omitted in explanation.

If negative in step S1224, 0 is substituted into OK in step S1227, and the process is finished.

Figure 22B:
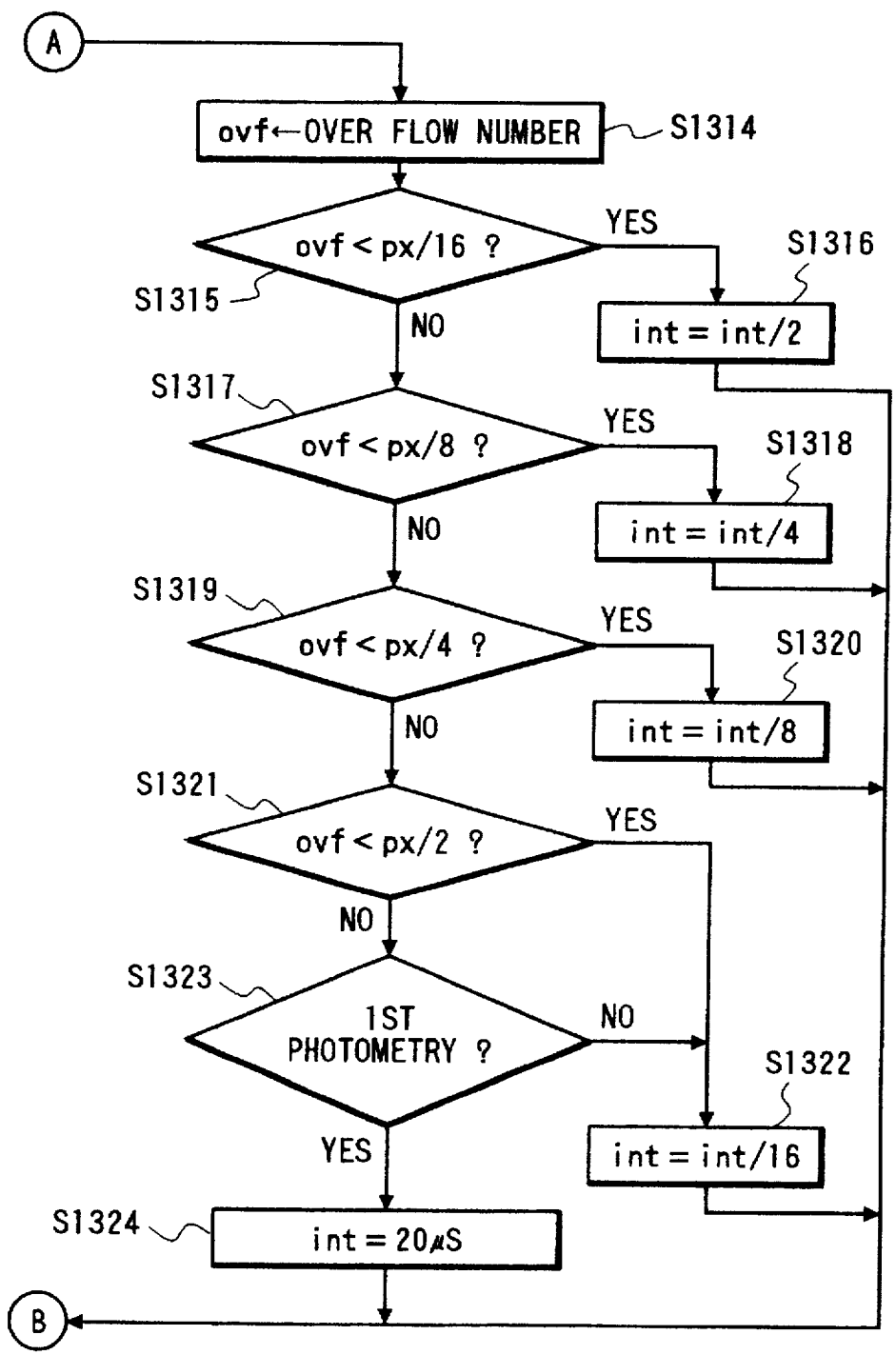
FIG. 22 is comprised of FIGS. 22A and 22B illustrating a flowchart showing an algorithm in this embodiment.

FIGS. 22A and 22B comprise a flowchart showing a subroutine for obtaining the charge time int of the next time. The main subroutine is called and executed by executing step S1108 in FIG. 19A. Before calling the main subroutine, the photometric process has been performed at least once after switching ON the power supply, and therefore the photometric data just anterior thereto are left in the unillustrated memory within the microprocessor 1100.

At first, in step S1301, whether or not the set photometric mode is the AMP mode is determined. If not, the processing proceeds to step S1302, wherein whether or not the photometric mode is the CW mode is determined.

If determined to be the AMP mode, in step S1303, 240 is substituted into a variable px representing the number of using photometric areas, and a photometric target level Vagc is set to 2.56 V. If determined to be the CW mode, the processing proceeds to step S1304, wherein the variable px and the level Vagc are set such as px=52, and Vagc=1.28 V. If determined to be the SP mode, the processing proceeds to step S1305, the variable px and the level Vagc are set such as px=4, and Vagc=0.64 V.

Next, in step S1306, the determination of the formula (5) is made in the same way as step S1208, i.e., whether or not the maximum value of the signal output is saturated, is determined. If the formula (5) is affirmative, the processing proceeds to step S1307, wherein whether or not the photometric data stored in the memory are concerned with the first photometric process after switching ON the power supply, is checked. If so, the processing proceeds to step S1308, wherein whether Vomax<40 mV is checked.

If Vomax is smaller than 40 mV, it is assumed that the field is considerably dark. Further, it is required that the proper exposure value be outputted as soon as possible on the assumption that the release button is fully pushed immediately when switching ON the power supply. Therefore, in this case, as shown in step S1309, the gain of the photometric device 9 is set to H, and a primary charge time is unconditionally determined to be 40 mS. This numerical value of 40 mS is determined in accordance with the photometric system in use, as a charge time enough to cover a range from the photometric lower limit demanded in the photometric apparatus of the camera to a brightness undetectable by the first photometric process as much as possible. Accordingly, this numerical value may be determined as an optimal value from the quick photographing property demanded in the camera, a lower luminance limit demanded in the photometric apparatus and a brightness in the photometric system.

If Vomax is 40 mV or above in step S1308, the charge time of the next time can be optimized by a calculation, and therefore the processing proceeds to step S1310.

In step S1310, whether Vomax=0 V is checked. If so, the charge time of the next time is set four times as large as that of the last time in step S1311. If step S1310 is negative, a charge time candidate value int' of the next time is obtained by the following formula (8) in step S1312.

$$int'=int.Vagc/(Vomax+Vopb) \quad (8)$$

What int' given by the formula (8) means is that Vomax+Vopb obtained when in the next photometric process is equalized to Vagc by performing the next photometric process using the charge time candidate value int' on the assumption that the brightness of the field in the last photometric process is equal to that in the next photometric process. Herein, int is a charge time of the last time, and Vagc is a target value of Vomax+Vopb and is a value set in step S1303 or S1304 or S1305 in accordance with the set photometric mode.

Next, in step S1313, the charge time of the next time is determined by the formula (9) which follows:

$$int=K.int'+(1-K).int \quad (9)$$

where int' is the charge time value obtained in step S1312, int is the charge time value of the last time, and K is the stability coefficient for preventing the charge time value from abruptly changing when measuring the light intensity under a flicker light source and is a variable taking a value as shown in FIG. 12 in accordance with the charge time value of the last time.

To consider this while being applied to the formula (9), if the charge time is 10 mS or under, K=0.25, and hence the charge time of the next time becomes a weighted mean at such a rate that 3 (int) versus 1 (int'). Further, when the charge time is 20 mS or larger, there are almost no influences of the flickers, and therefore K=1. Then, a new charge time is set by only the value of int'.

When the charge time takes a value between 10 mS and 20 mS, the K value gradually varies as shown in the formula (10).

$$K=0.075.int-0.5 \quad (10)$$

where int is the charge time value of the last time. The reason why it is better for the charge time not to change so much depending on the degree of influences exerted by the flickers is not concerned directly with the present invention and therefore omitted in explanation. Incidentally, it is desired that the K value be optimized depending on characteristics of the light source serving as a target and the photometric system of the camera and is not therefore limited to the values shown in FIG. 12.

On the other hand, if the determination of the formula (6) in step S1306 is negative, the processing proceeds to step S1314, and the number of overflow areas among the photometric areas is counted and substituted into a variable ovf. Herein, the overflow is determined depending on whether or not a sum of the signal output plus the dark current output of that area reaches Vov. A minimum value of ovf is 1 (the saturation area is only one), and a maximum value is px (all the segmented areas for use are overflow areas).

Whether ovf<px/16 is checked in step S1315. If so, the charge time int of the next time is set one-half the charge time of the last time in step S1316. Subsequently in step S1317, whether ovf<px/8 is checked. If so, the charge time int of the next time is set one fourth the charge time of the last time in step S1318. Next, whether ovf<px/4 is checked in step S1319. If so, the charge time int of the next time is set one eighth the charge time of the last time in step S1320. Subsequently, whether ovf<px/2 is checked in step S1321. If so, charge time int of the next time is set one sixteenth the charge time of the last time in step S1322.

If negative in step S1321, whether the photometric process of the last time is the first after switching ON the power supply, is checked in step S1323. In the case of being the first photometric process, as explained in FIGS. 10A and 10B, the photometric result, irrespective of being effective or ineffective, is used for calculating the proper exposure. Therefore, the charge time of the next time is set as short as 20 µS in step S1324 so as not to cause the overflow. If not the first photometric process, a process in step S1322 is executed.

In the processing in such a case that the photometric data overflows, as seen in steps S1315 through S1322, the field is conceived brighter with a larger number of the overflow photometric areas, and the charge time of the next time is set shorter than the last time.

Figure 23:
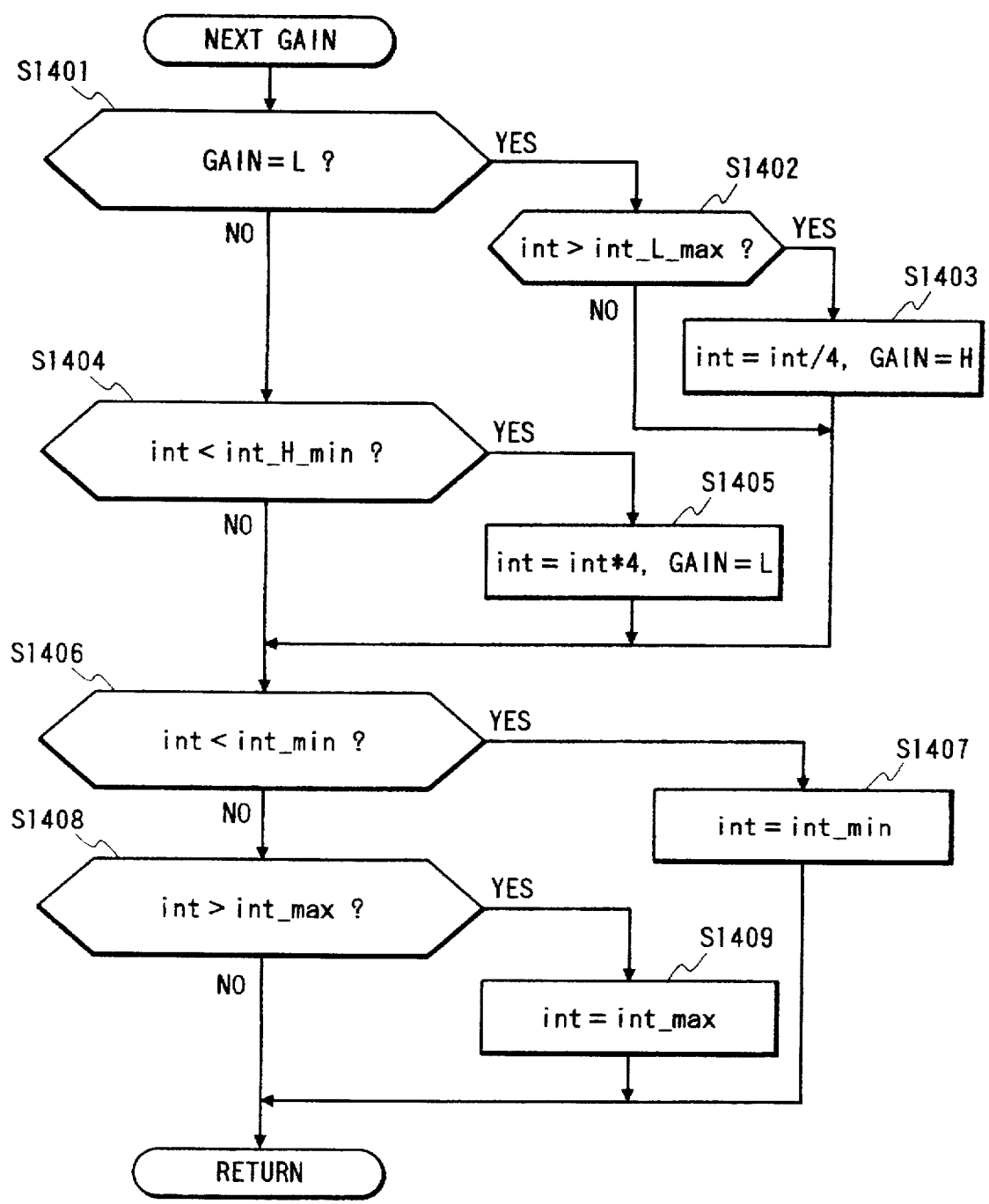
FIG. 23 is a flowchart showing an algorithm in this embodiment.
Figure 24:
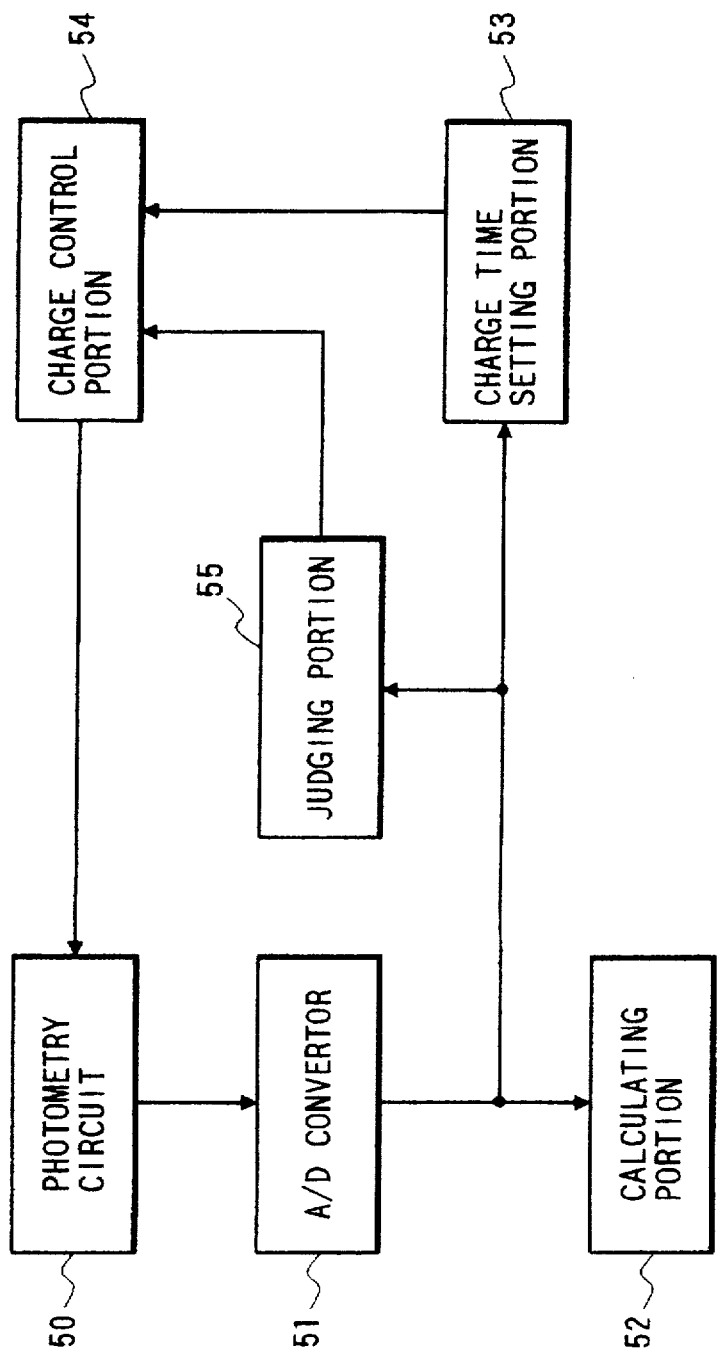
FIG. 24 is a block diagram showing a prior art.

FIG. 23 is a flowchart showing a subroutine for adjusting the gain of the outputting circuit 28 within the photometric device 9 when in the next photometric process. The main subroutine is called and executed by executing step S1109 in FIG. 19A.

In step S1401, whether or not the gain of the outputting circuit 28 is set to L, is checked. If the gain is L, in step S1402, whether or not the charge time int of the next time is expressed such as int>int_L_max, is determined. Herein, int_L_max is a threshold value for changing over the gain, and a numerical value on the order of 40 mS may be substituted thereinto. If the condition in step S1402 is satisfied, the processing proceeds to step S1403. Then, the gain is changed over to H when in the next photometric process, and the charge time int is set one fourth the value obtained in FIGS. 22A and 22B.

If negative in step S1401, the gain is H, and hence whether int<int_H_min is checked in step S1404. If so, the gain when in the next photometric process is set to L in step S1405, and the charge time is set four times the charge time int obtained in FIGS. 22A and 22B. Herein, a numerical value of approximately 5 mS may be substituted into int_H_min.

As can be known from the above example, it is desirable that a ratio of int_L_max versus int_H_min be a value that is over four times the gain H/L ratio. The photometric value can be thereby prevented from becoming unstable due to more gain changeovers than needed because of the hysteresis characteristic being yielded in the gain changeover even if there are more or less fluctuations in the photometric data.

Next, in step S1406, whether the charge time of the next time decreases under the predetermined minimum charge time int_min, is checked. If under int_min, the charge time is clipped to int_min in step S1407.

Similarly, in step S1408, whether or not the charge time of the next time exceeds the predetermined maximum charge time int_max, is checked. If over int_max, the charge time is clipped to int_max in step S1409.

Herein, the setting is such that int_min=10 µS, and int_max=100 mS. However, these values may be optimized depending on the photometric optical system in use and the photometric range as well.

Note that the target level setting portion 123 corresponds to the target value setting portion, the charge time setting portion 112 corresponds to the charge time determining portion, the AMP mode corresponds to the first mode, the CW mode or the SP mode corresponds to the second mode, and the determination level setting portion 122 corresponds to the effectiveness determining portion respectively in accordance with the present embodiment.

In the embodiments discussed above, the center emphatic photometry and the spot photometry that are based on the center of the picture have been exemplified. There may be, however, emphatic photometry and spot photometry on the basis of other arbitrary positions, e.g., multi-point distance measuring areas.

As discussed above in detail, according to the invention of the present application, the target value of the output of the photometric circuit is set to an optimal value in accordance with the setting by the photometric mode setting portion. The level of the photometric output can be thereby optimally controllable for every photometric mode.

According to the invention of the present application, the optimal target value can be set corresponding to the areas in use by selecting the areas to be used within the plurality of areas in accordance with the set photometric mode.

According to the invention of the present application, the target value is set smaller with a smaller photometric area, and hence there decreases the probability that the photometric value overflows due to the fluctuations in the photometric output in the case of the small photometric areas.

According to the invention of the present application, the target value in the first mode for calculating the luminance value of a specified area of the field is set smaller than the target value in the second mode for calculating the luminance values of the plurality of areas of the field. As a result, there is reduced the probability that the photometric value overflows in the first mode in which a comparatively wide photometric range is not required.

According to the invention of the present application, there is optimized the fiducial value for determining whether the output of the photometric circuit is effective or ineffective in accordance with the setting by the photometric mode setting portion, whereby the optimal determination can be made for every photometric mode.

According to the invention of the present application, the optimal fiducial value can be set corresponding to the areas in use by selecting the areas to be used within the plurality of areas in accordance with the set photometric mode.

According to the invention of the present application, the probability that the photometric output is determined to be ineffective in the case of the small photometric areas by setting the fiducial value smaller as the photometric area becomes smaller.

According to the invention of the present application, the fiducial value in the first mode for calculating the luminance value of the specified area of the field is set smaller than the fiducial value in the second mode for calculating the luminance values of the plurality of areas of the field.

Consequently, there decreases the probability that the photometric value is determined to be ineffective in the first mode in which the comparatively wide photometric range is not required.

According to the invention of the present application, the effectiveness determining portion compares the output value of the maximum luminance within the using areas with the fiducial value and, when the output value is larger than the fiducial value, makes the output of the photometric circuit effective. It is thereby possible to make the determination about the effectiveness and ineffectiveness more surely.

It is apparent that, in this invention, a wide range of different working modes can be formed based on the invention without deviating from the spirit and scope of the invention. This invention is not restricted by its specific working modes except being limited by the appended claims.

What is claimed is:

1. A photometric apparatus for measuring variable light intensity of a field, comprising:
   a photometric circuit to measure the light intensity of the field; and
   a calculating portion to calculate a variable target value and a charge time on the basis of the variable target value.

2. A photometric apparatus, comprising:
   a photometric circuit to measure a light intensity of a field by use of a charge type photometric device; and
   a calculating portion to calculate a variable target value and a charge time of a next photometric process that follows a last photometric process so that a photometric output of the next photometric process approximates the calculated variable target value on the basis of an output value of said photometric circuit and a charge time of the last photometric process.

3. A photometric apparatus according to claim 2, wherein said calculating portion changes the variable target value in accordance with a charge time of the last photometric process.

4. A photometric apparatus according to claim 2, wherein said charge type photometric device is a division type photometric device that generates photometric outputs, and
   said calculating portion calculates the charge time of the next photometric process so that a maximum value of the photometric outputs of said charge type photometric device approximates the calculated variable target value.

5. A photometric apparatus according to claim 2, wherein said calculating portion calculates the variable target value to be high if the charge time of the last photometric process is long and calculates the variable target value to be low if the charge time of the last photometric process is short.

6. A photometric apparatus according to claim 2, wherein said calculating portion calculates the charge time of the next photometric process on the basis of the following formula:

$$Int'=Int \times (Vagc \times X)/(Vomax+Vopb)$$

where
   Int': charge time candidate value of the next time,
   Int: charge time of the last time,
   Vagc: target value of Vomax+Vopb,
   X: target value correction coefficient determined corresponding to Int,
   Vomax: photometric value of an area with a maximum signal component among a plurality of photometric areas, and
   Vopb: output of the area existing in the same line as the photometric areas where Vomax exists.

7. A photometric apparatus according to claim 6, wherein said calculaing portion calculates the charge time of the next photometric process on the basis of the following formula:

$$Int=K \times Int'+(1-K) \times Int$$

where
   K: stability constant determined based on the charge time.

8. A photometric apparatus comprising:
   a photometric circuit for measuring a light intensity of a field by use of a charge type photometric device while dividing the field into a plurality of areas and outputting a plurality of photometric outputs corresponding to the plurality of areas;
   a photometric mode setting portion capable of setting a plurality of photometric modes;
   a target value setting portion for setting a target value of the output of said photometric circuit in accordance with setting by said photometric mode setting portion; and
   a determining portion for determining a new charge time of said photometric device on the basis of the output of said photometric circuit, a charge time when in the photometric process and the target value of said target value setting portion.

9. A photometric apparatus according to claim 8, wherein said photometric mode setting portion selects the area a photometric value of which is used among the plurality of areas in accordance with the set photometric mode.

10. A photometric apparatus according to claim 8, wherein said photometric mode setting portion is capable of setting a plurality of photometric areas having different sizes, and
   said target value setting portion sets the target value smaller with the smaller photometric area.

11. A photometric apparatus according to claim 8, wherein said photometric mode setting portion is capable of setting a first mode for calculating a luminance value of a specified area of the field, and a second mode for calculating a plurality of luminance values with respect to the plurality of areas of the field on the basis of outputs of said photometric apparatus, and
   said target value setting portion sets a target value in the first mode smaller than a target value in the second mode.

12. A photometric apparatus according to claim 8, wherein said determining portion determines a charge time of the next time based on the following formula:

$$Int'=Int \times (Vagc \times X)/(Vomax+Vopb)$$

where
   Int': charge time candidate value of the next time,
   Int: charge time of the last time,
   Vagc: target value of Vomax+Vopb,
   X: target value correction coefficient determined corresponding to Int,
   Vomax: photometric value of an area with a maximum signal component among a plurality of photometric areas, and
   Vopb: output of the area existing in the same line as the photometric area where Vomax exists.

13. A photometric apparatus according to claim 12, wherein said determining portion determines the charge time of the next time on the basis of the following formula:

$$Int = K \times Int' + (1-K) \times Int$$

where

K: stability constant determined based on the charge time.

14. A photometric apparatus comprising:

a photometric circuit for measuring a light intensity of a field by use of a charge type photometric device while dividing the field into a plurality of areas and outputting a plurality of photometric outputs corresponding to the plurality of areas;

a determining portion for determining a new charge time of said photometric device on the basis of the output of said photometric circuit, and a charge time when in the photometric process;

a photometric mode setting portion capable of setting a plurality of photometric modes;

a fiducial value setting portion for setting a fiducial value in accordance with setting by said photometric mode setting portion; and a judging portion for judging whether or not the output of said photometric output is effective on the basis of the output of said photometric circuit and the fiducial value.

15. A photometric apparatus according to claim 14, wherein said photometric mode setting portion selects the area a photometric value of which is used among the plurality of areas in accordance with the set photometric mode.

16. A photometric apparatus according to claim 14, wherein said photometric mode setting portion is capable of setting a plurality of photometric areas having different sizes, and said fiducial value setting portion sets the fiducial value smaller with the smaller photometric area.

17. A photometric apparatus according to claim 14, wherein said photometric mode setting portion is capable of setting a first mode for calculating a luminance value of a specified area of the field, and a second mode for calculating a plurality of luminance values with respect to the plurality of areas of the field on the basis of outputs of said photometric apparatus, and said fiducial value setting portion sets a fiducial value in the first mode smaller than a fiducial value in the second mode.

18. A photometric apparatus according to claim 14, wherein said photometric mode setting portion selects the area a photometric value of which is used among the plurality of areas in accordance with the set photometric mode, and said judging portion compares an output value of a maximum luminance within the using areas with the fiducial value and, if the output value is larger than the fiducial value, judges that the output of said photometric circuit is effective.

19. A photometric apparatus according to claim 14, wherein said determining portion determines a charge time of the next time based on the following formula:

$$Int' = Int \times (Vagc \times X)/(Vomax + Vopb)$$

where

Int': charge time candidate value of the next time,

Int: charge time of the last time,

Vagc: target value of Vomax+Vopb,

X: target value correction coefficient determined corresponding to Int,

Vomax: photometric value of an area with a maximum signal component among a plurality of photometric areas, and Vopb: output of the area existing in the same line as the photometric area where Vomax exists.

20. A photometric apparatus according to claim 19, wherein said determining portion determines the charge time of the next time on the basis of the following formula:

$$Int = K \times Int' + (1-K) \times Int$$

where

K: stability constant determined based on the charge time.

21. A photometric apparatus, comprising:

a photometric circuit to measure luminous intensity of an object and output corresponding photometric data during a last charge time and a next charge time; and a charge time circuit to calculate the next charge time based on the last charge time and photometric data of the photometric circuit corresponding to the last charge time with respect to a variable target value, wherein when the photometric data of the next charge time is not equal to the photometric data of the last charge time, the charge time circuit changes the variable target value.

22. A photometric apparatus that calculates a next charge time based on a last charge time and photometric data corresponding to light intensity of the last charge time, comprising:

means for measuring light intensity and outputting corresponding photometric data; and means for calculating the next charge time, based on the last charge time and corresponding output photometric data, with respect to a variable target value, wherein when a light intensity corresponding to the next charge time does not equal the light intensity of the last charge time, the calculating means changes the variable target value.

* * * * *